(12) United States Patent
Dijkstra et al.

(10) Patent No.: US 11,673,738 B2
(45) Date of Patent: Jun. 13, 2023

(54) CAPSULE, A SYSTEM FOR PREPARING A POTABLE BEVERAGE FROM SUCH A CAPSULE AND USE OF SUCH A CAPSULE IN A BEVERAGE PREPARATION DEVICE

(71) Applicant: Koninklijke Douwe Egberts B.V., Utrecht (NL)

(72) Inventors: Hielke Dijkstra, Neede (NL); Erik Pieter Van Gaasbeek, Borculo (NL); Ralf Kamerbeek, De Meern (NL); Arend Hendrik Groothornte, Borculo (NL); Marc Hendrikus Joseph Ottenschot, Delden (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 661 days.

(21) Appl. No.: 16/188,173

(22) Filed: Nov. 12, 2018

(65) Prior Publication Data

US 2019/0177078 A1 Jun. 13, 2019

Related U.S. Application Data

(63) Continuation of application No. PCT/NL2017/050300, filed on May 15, 2017.

(30) Foreign Application Priority Data

May 13, 2016 (NL) ...................................... 2016780

(51) Int. Cl.
*B65D 85/804* (2006.01)
*A47J 31/36* (2006.01)
*A47J 31/40* (2006.01)

(52) U.S. Cl.
CPC ........ *B65D 85/8064* (2020.05); *A47J 31/369* (2013.01); *A47J 31/407* (2013.01)

(58) Field of Classification Search
CPC ... A47J 31/369; A47J 31/407; B65D 85/8043; C07C 69/75; C07C 2601/14;
(Continued)

(56) References Cited

U.S. PATENT DOCUMENTS

| 4,651,538 A | 3/1987 | Bull |
| 5,798,599 A | 8/1998 | Harwood |

(Continued)

FOREIGN PATENT DOCUMENTS

| AU | 2015255218 A1 | 11/2015 |
| AU | 2015255218 A1 | 11/2015 |

(Continued)

OTHER PUBLICATIONS

U.S. Appl. No. 16/188,152, filed Nov. 12, 2018, Koninklijke Douwe Egberts B.V.

(Continued)

*Primary Examiner* — Ibrahime A Abraham
*Assistant Examiner* — Dilnessa B Belay
(74) *Attorney, Agent, or Firm* — Fitch, Even, Tabin & Flannery LLP

(57) ABSTRACT

A capsule containing a substance for the preparation of a potable beverage. The capsule comprises an aluminum capsule body having a side wall and an outwardly extending flange. The capsule is hermetically closed by an aluminum cover attached to the outwardly extending flange. The capsule further comprises a sealing member at the outwardly extending flange for providing a fluid sealing contact with an enclosing member of a beverage preparation device. The capsule further comprises an elastic support structure, which is attached to an outer cover surface of said cover. In a condition, in which the capsule is freely resting with said elastic support structure on a fully straight reference surface, the elastic support structure provides a spacing between the (Continued)

outwardly extending flange and said reference surface, said spacing being constant all around in the circumferential capsule direction.

22 Claims, 10 Drawing Sheets

(58) Field of Classification Search
CPC ........ C07C 51/36; C07C 67/303; B01J 27/13; B01J 35/0026; B01J 35/023; B01J 35/026; B01J 35/08; B01J 35/1019; B01J 37/0201; B01J 37/18
See application file for complete search history.

(56) References Cited

U.S. PATENT DOCUMENTS

| | | | |
|---|---|---|---|
| 5,897,899 A | 4/1999 | Fond | |
| 6,550,157 B1 | 4/2003 | Harding | |
| 8,176,714 B2 | 5/2012 | Abegglen | |
| 2001/0048178 A1 | 12/2001 | Jud | |
| 2005/0061705 A1 | 3/2005 | Spallek | |
| 2005/0084695 A1 | 4/2005 | Shirane | |
| 2005/0155991 A1 | 7/2005 | Jackman | |
| 2006/0110507 A1 | 5/2006 | Yoakim | |
| 2007/0202237 A1 | 8/2007 | Yoakim | |
| 2008/0044603 A1 | 2/2008 | Hutchinson | |
| 2009/0017177 A1 | 1/2009 | Yoakim et al. | |
| 2009/0223373 A1 | 9/2009 | Kollep | |
| 2009/0280219 A1 | 11/2009 | Yoakim | |
| 2009/0320692 A1 | 12/2009 | Simanski | |
| 2010/0015307 A1 | 1/2010 | Abegglen et al. | |
| 2010/0178404 A1 | 7/2010 | Yoakim | |
| 2010/0183777 A1 | 7/2010 | Sagy | |
| 2011/0000917 A1 | 1/2011 | Wolters | |
| 2011/0020500 A1 | 1/2011 | Eichler | |
| 2011/0027547 A1 | 2/2011 | Xun | |
| 2011/0041702 A1 | 2/2011 | Yoakim | |
| 2011/0185910 A1 | 8/2011 | Ryser | |
| 2011/0185911 A1 | 8/2011 | Rapparini | |
| 2011/0200725 A1 | 8/2011 | Kollep | |
| 2011/0259204 A1 | 10/2011 | Kaeser | |
| 2011/0315021 A1 | 12/2011 | Eichler | |
| 2012/0031794 A1 | 2/2012 | Ozanne | |
| 2012/0225168 A1* | 9/2012 | Kamerbeek | A47J 31/368 206/0.5 |
| 2012/0231123 A1 | 9/2012 | Kamerbeek | |
| 2012/0244384 A1 | 9/2012 | Burt | |
| 2012/0251694 A1 | 10/2012 | Kamerbeek | |
| 2013/0099597 A1 | 4/2013 | Perentes et al. | |
| 2013/0180408 A1 | 7/2013 | Eichler et al. | |
| 2013/0224341 A1 | 8/2013 | Bendavid | |
| 2013/0259982 A1* | 10/2013 | Abegglen | B65D 85/8061 426/115 |
| 2013/0340478 A1 | 12/2013 | Miyoshi | |
| 2014/0170271 A1 | 6/2014 | Zweed et al. | |
| 2014/0178537 A1 | 6/2014 | Zweed et al. | |
| 2014/0328983 A1 | 11/2014 | Jarisch | |
| 2015/0033947 A1 | 2/2015 | Van Der Kamp | |
| 2015/0151903 A1 | 6/2015 | Bartoli | |
| 2015/0158609 A1* | 6/2015 | Villain | B65B 29/022 426/112 |
| 2015/0223632 A1 | 8/2015 | Hall | |
| 2016/0037961 A1 | 2/2016 | Digiuni | |
| 2016/0075506 A1 | 3/2016 | Chapman | |
| 2016/0159563 A1 | 6/2016 | Bartoli | |
| 2016/0353918 A1* | 12/2016 | Talon | A47J 31/3695 |
| 2016/0362246 A1 | 12/2016 | Garcin | |
| 2016/0362247 A1 | 12/2016 | Bartoli | |
| 2017/0158422 A1 | 6/2017 | Andreae | |
| 2017/0325619 A1 | 11/2017 | Holten | |
| 2018/0105355 A1 | 4/2018 | Harif | |
| 2018/0257856 A1 | 9/2018 | Oliver | |
| 2018/0273286 A1 | 9/2018 | Dijkstra et al. | |
| 2018/0289201 A1 | 10/2018 | Dijkstra | |
| 2018/0290824 A1 | 10/2018 | Dijkstra et al. | |
| 2018/0290825 A1 | 10/2018 | Dijkstra et al. | |
| 2018/0297775 A1 | 10/2018 | Dijkstra et al. | |
| 2018/0297776 A1 | 10/2018 | Dijkstra et al. | |
| 2019/0177078 A1 | 6/2019 | Dijkstra | |
| 2020/0047986 A1 | 2/2020 | Kamerbeek | |
| 2020/0047987 A1 | 2/2020 | Kamerbeek | |

FOREIGN PATENT DOCUMENTS

| | | |
|---|---|---|
| AU | 2016253679 A1 | 11/2016 |
| AU | 2016253679 A1 | 11/2016 |
| AU | 2017219060 A1 | 9/2017 |
| AU | 2017219060 A1 | 9/2017 |
| CA | 2901582 A1 | 11/2014 |
| CN | 105188488 | 12/2015 |
| DE | 10 2008 014 758 A1 | 10/2009 |
| DE | 20 2009 009 125 U1 | 10/2010 |
| DE | 10 2010 027 484 A1 | 1/2012 |
| DE | 10 2010 034 260 A1 | 2/2012 |
| DE | 10 2010 047 890 A1 | 2/2012 |
| DE | 20 2013 005 950 U1 | 11/2013 |
| DE | 20 2015 004 716 U1 | 11/2015 |
| DE | 202016106171 U1 | 11/2016 |
| EP | 0 468 079 | 1/1992 |
| EP | 0 844 195 B1 | 5/1998 |
| EP | 1 165 398 B1 | 12/2002 |
| EP | 1 190 959 B1 | 3/2004 |
| EP | 1 654 966 B1 | 5/2006 |
| EP | 1 700 548 | 9/2006 |
| EP | 1 700 584 A1 | 9/2006 |
| EP | 1 299 022 B1 | 2/2007 |
| EP | 1 339 305 B1 | 4/2007 |
| EP | 1 646 305 B1 | 9/2007 |
| EP | 1 849 715 B1 | 10/2007 |
| EP | 1 882 431 B1 | 1/2008 |
| EP | 1 892 199 A1 | 2/2008 |
| EP | 1 839 543 B1 | 6/2008 |
| EP | 1 859 712 B1 | 1/2009 |
| EP | 1 859 714 B1 | 2/2009 |
| EP | 2 070 828 B1 | 6/2009 |
| EP | 1 816 934 B1 | 11/2009 |
| EP | 1 967 099 B1 | 1/2010 |
| EP | 1 900 653 B1 | 3/2010 |
| EP | 2 029 457 B1 | 3/2010 |
| EP | 1 882 432 B1 | 7/2010 |
| EP | 2 230 195 A1 | 9/2010 |
| EP | 2 142 054 B1 | 1/2011 |
| EP | 2 068 684 B1 | 2/2011 |
| EP | 2284101 B1 | 2/2011 |
| EP | 2289820 A1 | 3/2011 |
| EP | 2308776 A1 | 4/2011 |
| EP | 2 205 133 B1 | 6/2011 |
| EP | 2 284 100 B1 | 6/2011 |
| EP | 2 284 101 B1 | 9/2011 |
| EP | 2 364 930 A2 | 9/2011 |
| EP | 2 151 313 B1 | 10/2011 |
| EP | 2 229 082 B1 | 12/2011 |
| EP | 2 012 994 B1 | 7/2012 |
| EP | 2 385 922 B1 | 8/2012 |
| EP | 2 489 609 A1 | 8/2012 |
| EP | 2489609 A1 | 8/2012 |
| EP | 2516296 A1 | 10/2012 |
| EP | 2 374 383 B1 | 11/2012 |
| EP | 2 573 008 A1 | 3/2013 |
| EP | 2 631 198 A1 | 8/2013 |
| EP | 2 631 199 A1 | 8/2013 |
| EP | 2 512 302 B1 | 9/2013 |
| EP | 2 682 028 A1 | 1/2014 |
| EP | 2 690 035 A1 | 1/2014 |
| EP | 2 712 824 A1 | 4/2014 |
| EP | 2712824 A1 | 4/2014 |
| EP | 2 757 056 A1 | 7/2014 |
| EP | 2 516 296 A1 | 8/2014 |
| EP | 2 801 538 A1 | 11/2014 |
| EP | 2 334 564 B1 | 3/2015 |
| EP | 2 868 598 A1 | 5/2015 |
| EP | 3 023 360 B1 | 1/2018 |
| ES | 1137034 U | 3/2015 |

(56) References Cited

FOREIGN PATENT DOCUMENTS

| | | |
|---|---|---|
| ES | 1137034 U | 3/2015 |
| ES | 1142506 U | 8/2015 |
| ES | 1142506 U | 8/2015 |
| FR | 2973209 A1 | 10/2012 |
| GB | 2 503 697 B | 12/2014 |
| GB | 2 519 319 A | 4/2015 |
| GB | 2519319 A | 4/2015 |
| GB | 2 503 774 B | 6/2015 |
| GB | 2 523 775 A | 9/2015 |
| GB | 2523775 A | 9/2015 |
| WO | 2006045515 | 5/2006 |
| WO | 2006045536 A1 | 5/2006 |
| WO | WO-2006/045536 A1 | 5/2006 |
| WO | 2007122206 A1 | 11/2007 |
| WO | WO-2007/122206 A1 | 11/2007 |
| WO | 2008037642 A1 | 4/2008 |
| WO | WO-2008/037642 A1 | 4/2008 |
| WO | 2009115474 A1 | 9/2009 |
| WO | 2009128016 A1 | 10/2009 |
| WO | WO-2009/128016 A1 | 10/2009 |
| WO | 2010055465 A1 | 5/2010 |
| WO | WO-2010/055465 A1 | 5/2010 |
| WO | 2010084475 A2 | 7/2010 |
| WO | WO-2010/084475 A2 | 7/2010 |
| WO | 2010115970 A1 | 10/2010 |
| WO | 2010116284 A2 | 10/2010 |
| WO | WO-2010/115970 A1 | 10/2010 |
| WO | WO-2010/116284 A | 10/2010 |
| WO | 2010128844 A1 | 11/2010 |
| WO | WO-2010/128844 A1 | 11/2010 |
| WO | 2010137946 | 12/2010 |
| WO | 2010137952 A1 | 12/2010 |
| WO | WO-2010/137952 A1 | 12/2010 |
| WO | 2011000005 A1 | 1/2011 |
| WO | 2011010263 A1 | 1/2011 |
| WO | WO-2011/000005 A1 | 1/2011 |
| WO | WO-2011/010263 A1 | 1/2011 |
| WO | 2011092301 | 8/2011 |
| WO | 2011113854 A2 | 9/2011 |
| WO | WO-2011/113854 A2 | 9/2011 |
| WO | 2012011053 A1 | 1/2012 |
| WO | WO-2012/011053 A1 | 1/2012 |
| WO | 2012013556 A1 | 2/2012 |
| WO | WO-2012/013556 A1 | 2/2012 |
| WO | 2012038063 A1 | 3/2012 |
| WO | WO-2012/038063 A1 | 3/2012 |
| WO | 2012045184 A1 | 4/2012 |
| WO | WO-2012/045184 A1 | 4/2012 |
| WO | 2012100836 | 8/2012 |
| WO | 2012110323 A1 | 8/2012 |
| WO | WO-2012/110323 A1 | 8/2012 |
| WO | 2012118367 A1 | 9/2012 |
| WO | 2012120459 A1 | 9/2012 |
| WO | 2012122329 A1 | 9/2012 |
| WO | 2012123857 A1 | 9/2012 |
| WO | WO-2012/118367 A1 | 9/2012 |
| WO | WO-2012/120459 A1 | 9/2012 |
| WO | WO-2012/122329 A1 | 9/2012 |
| WO | WO-2012/123857 A1 | 9/2012 |
| WO | 2012144885 A1 | 10/2012 |
| WO | WO-2012/144885 A1 | 10/2012 |
| WO | 2013043048 A1 | 3/2013 |
| WO | WO-2013/043048 A1 | 3/2013 |
| WO | 2013046014 A1 | 4/2013 |
| WO | 2013053655 A1 | 4/2013 |
| WO | WO-2013/046014 A1 | 4/2013 |
| WO | 2013060654 A1 | 5/2013 |
| WO | 2013060918 A1 | 5/2013 |
| WO | 2013068242 A1 | 5/2013 |
| WO | WO-2013/060654 A1 | 5/2013 |
| WO | WO-2013/060918 A1 | 5/2013 |
| WO | WO-2013/068242 A1 | 5/2013 |
| WO | 2013079811 A1 | 6/2013 |
| WO | WO-2013/079811 A1 | 6/2013 |
| WO | 2013132435 A1 | 9/2013 |
| WO | 2013135937 A2 | 9/2013 |
| WO | 2013136209 A1 | 9/2013 |
| WO | 2013136240 A1 | 9/2013 |
| WO | WO-2013/132435 A1 | 9/2013 |
| WO | WO-2013/135937 A2 | 9/2013 |
| WO | WO-2013/136209 A1 | 9/2013 |
| WO | WO-2013/136240 A1 | 9/2013 |
| WO | 2013144838 A1 | 10/2013 |
| WO | 2013153169 A2 | 10/2013 |
| WO | 2013157924 A1 | 10/2013 |
| WO | 2013157927 A | 10/2013 |
| WO | WO-2013/144838 A1 | 10/2013 |
| WO | WO-2013/153169 A2 | 10/2013 |
| WO | WO-2013/157924 A1 | 10/2013 |
| WO | 2013164669 A1 | 11/2013 |
| WO | WO-2013/164669 A1 | 11/2013 |
| WO | 2013189923 A1 | 12/2013 |
| WO | 2013190426 A1 | 12/2013 |
| WO | WO-2013/189923 A1 | 12/2013 |
| WO | WO-2013/190426 A1 | 12/2013 |
| WO | 2014001584 A1 | 1/2014 |
| WO | 2014012779 A2 | 1/2014 |
| WO | 2014012783 A2 | 1/2014 |
| WO | WO-2014/001584 A1 | 1/2014 |
| WO | WO-2014/012779 A2 | 1/2014 |
| WO | WO-2014/012783 A2 | 1/2014 |
| WO | 2014033344 A1 | 3/2014 |
| WO | WO-2014/033344 A1 | 3/2014 |
| WO | 2014053638 A1 | 4/2014 |
| WO | WO-2014/053638 A1 | 4/2014 |
| WO | 2014067507 A2 | 5/2014 |
| WO | 2014072942 A2 | 5/2014 |
| WO | 2014076041 A1 | 5/2014 |
| WO | WO-2014/067507 A2 | 5/2014 |
| WO | WO-2014/072942 A2 | 5/2014 |
| WO | WO-2014/076041 A1 | 5/2014 |
| WO | 2014118812 A1 | 8/2014 |
| WO | 2014125390 A1 | 8/2014 |
| WO | 2014128315 A1 | 8/2014 |
| WO | WO-2014/118812 A1 | 8/2014 |
| WO | WO-2014/125390 A1 | 8/2014 |
| WO | WO-2014/128315 A1 | 8/2014 |
| WO | 2014167526 A1 | 10/2014 |
| WO | WO-2014/167526 A1 | 10/2014 |
| WO | 2014184651 A1 | 11/2014 |
| WO | 2014184652 A1 | 11/2014 |
| WO | 2014184653 A1 | 11/2014 |
| WO | WO-2014/184651 A1 | 11/2014 |
| WO | WO-2014/184652 A1 | 11/2014 |
| WO | WO-2014/184653 A1 | 11/2014 |
| WO | 2014191412 A1 | 12/2014 |
| WO | 2014191413 A1 | 12/2014 |
| WO | 2014198474 A1 | 12/2014 |
| WO | 2014202105 A1 | 12/2014 |
| WO | WO-2014/191412 A1 | 12/2014 |
| WO | WO-2014/191413 A1 | 12/2014 |
| WO | WO-2014/198474 A1 | 12/2014 |
| WO | WO-2014/202105 A1 | 12/2014 |
| WO | 2015011683 A1 | 1/2015 |
| WO | WO-2015/011683 A1 | 1/2015 |
| WO | 2015056202 A1 | 4/2015 |
| WO | WO-2015/056202 A1 | 4/2015 |
| WO | 2015075584 A1 | 5/2015 |
| WO | WO-2015/075584 A1 | 5/2015 |
| WO | 2015082982 A1 | 6/2015 |
| WO | 2015087180 A1 | 6/2015 |
| WO | WO-2015/082982 A1 | 6/2015 |
| WO | WO-2015/087180 A1 | 6/2015 |
| WO | 2015101394 A1 | 7/2015 |
| WO | 2015104171 A1 | 7/2015 |
| WO | 2015104172 A1 | 7/2015 |
| WO | WO-2015/101394 A1 | 7/2015 |
| WO | WO-2015/104171 A1 | 7/2015 |
| WO | WO-2015/104172 A1 | 7/2015 |
| WO | 2015128527 A1 | 9/2015 |
| WO | 2015128799 A1 | 9/2015 |
| WO | 2015128827 A1 | 9/2015 |
| WO | WO-2015/128527 A1 | 9/2015 |
| WO | WO-2015/128799 A1 | 9/2015 |

(56) References Cited

FOREIGN PATENT DOCUMENTS

| WO | WO-2015/128827 | A1 | 9/2015 |
|----|----|----|----|
| WO | 2015180960 | A1 | 12/2015 |
| WO | WO-2015/180960 | A1 | 12/2015 |
| WO | 2016041596 | A1 | 3/2016 |
| WO | WO-2016/041596 | A1 | 3/2016 |
| WO | 2016074189 | A1 | 5/2016 |
| WO | 2016186488 | A1 | 11/2016 |
| WO | 2016186489 | | 11/2016 |
| WO | 2016186489 | A1 | 11/2016 |
| WO | 2016186491 | | 11/2016 |
| WO | 2016186491 | A1 | 11/2016 |
| WO | 2016186492 | | 11/2016 |
| WO | 2016186492 | A1 | 11/2016 |
| WO | 2016186496 | | 11/2016 |
| WO | 2016186496 | A1 | 11/2016 |
| WO | 2017074189 | | 5/2017 |
| WO | 2017074189 | A1 | 5/2017 |

OTHER PUBLICATIONS

International Search Report and Written Opinion, PCT/NL2017/050300 (dated Jul. 19, 2017).

"Nespresso", Wikipedia Archive, published Nov. 29, 2012, 8 pages.

International Preliminary Report on Patentability, PCT/NL2016/050341, Koninklijke Douwe Egberts B.V., 8 pages (dated Nov. 21, 2017).

International Preliminary Report on Patentability, PCT/NL2016/050342, Koninklijke Douwe Egberts B.V., 8 pages (dated Nov. 21, 2017).

International Preliminary Report on Patentability, PCT/NL2016/050344, Koninklijke Douwe Egberts B.V., 8 pages (dated Nov. 21, 2017).

International Preliminary Report on Patentability, PCT/NL2016/050346, Koninklijke Douwe Egberts B.V., 7 pages (dated Nov. 21, 2017).

International Preliminary Report on Patentability, PCT/NL2016/050349, 7 pages (dated Nov. 21, 2017).

International Preliminary Report on Patentability, PCT/NL2016/050350, Koninklijke Douwe Egberts B.V., 8 pages (dated Nov. 21, 2017).

International Preliminary Report on Patentability, PCT/NL2016/050749, Koninklijke Douwe Egberts B.V., 7 pages (dated May 1, 2018).

International Preliminary Report on Patentability, PCT/NL2017/050663, 7 pages (dated Apr. 9, 2019).

International Search Report and Written Opinion, PCT/NL2016/050341, Koninklijke Douwe Egberts B.V., 13 pages (dated Oct. 27, 2016).

International Search Report and Written Opinion, PCT/NL2016/050342, Koninklijke Douwe Egberts B.V., 13 pages (dated Nov. 8, 2016).

International Search Report and Written Opinion, PCT/NL2016/050344, Koninklijke Douwe Egberts B.V., 13 pages (dated Oct. 27, 2016).

International Search Report and Written Opinion, PCT/NL2016/050346, Koninklijke Douwe Egberts B.V., 12 pages (dated Nov. 10, 2016).

International Search Report and Written Opinion, PCT/NL2016/050350, Koninklijke Douwe Egberts B.V., 13 pages (dated Nov. 2, 2016).

International Search Report and Written Opinion, PCT/NL2016/050749, Koninklijke Douwe Egberts B.V., 10 pages (dated Feb. 22, 2017).

International Search Report and Written Opinion, PCT/NL2017/050301, 15 pages (dated Jul. 19, 2017).

International Search Report and Written Opinion, PCT/NL2017/050659, 12 pages (dated Jan. 17, 2018).

International Search Report and Written Opinion, PCT/NL2017/050663, 12 pages (dated Jan. 17, 2018).

International Search Report and Written Opinion, PCT/NL2018/050486, 14 pages (dated Oct. 18, 2018).

Notice of Opposition, dated Jan. 24, 2020 for EP Application No. 16744560.0, 41 pages.

Nullity Action on DE 202016106171.7, 96 pages (dated Dec. 20, 2019).

* cited by examiner

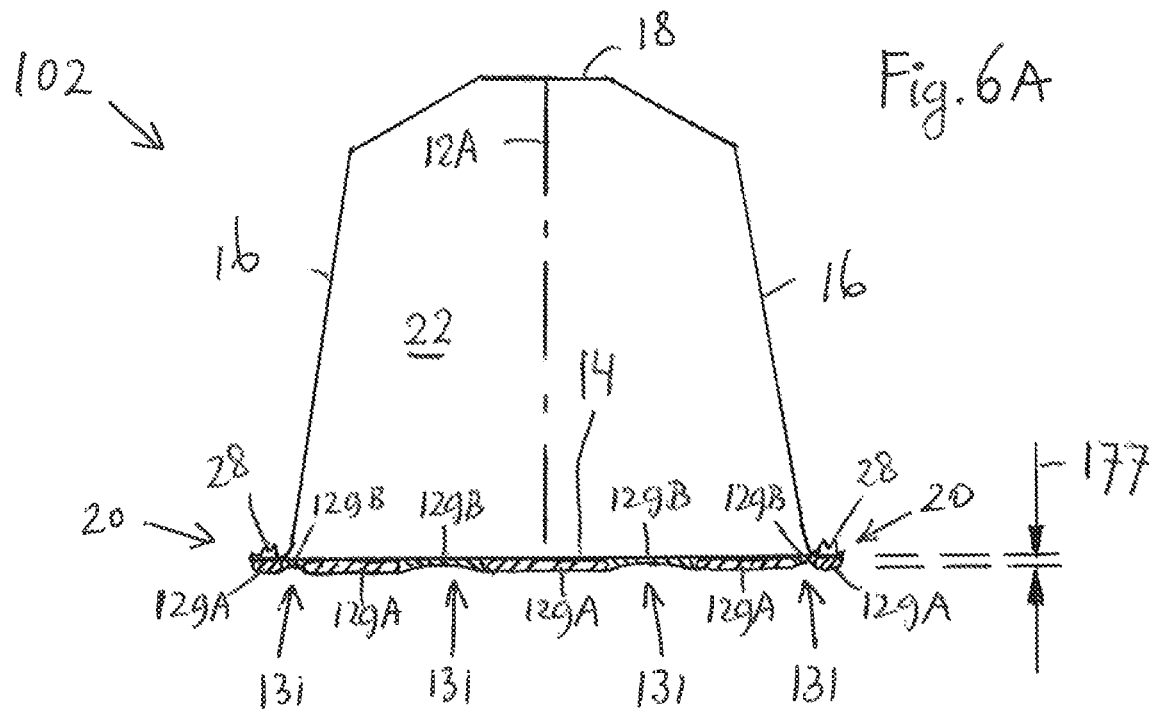
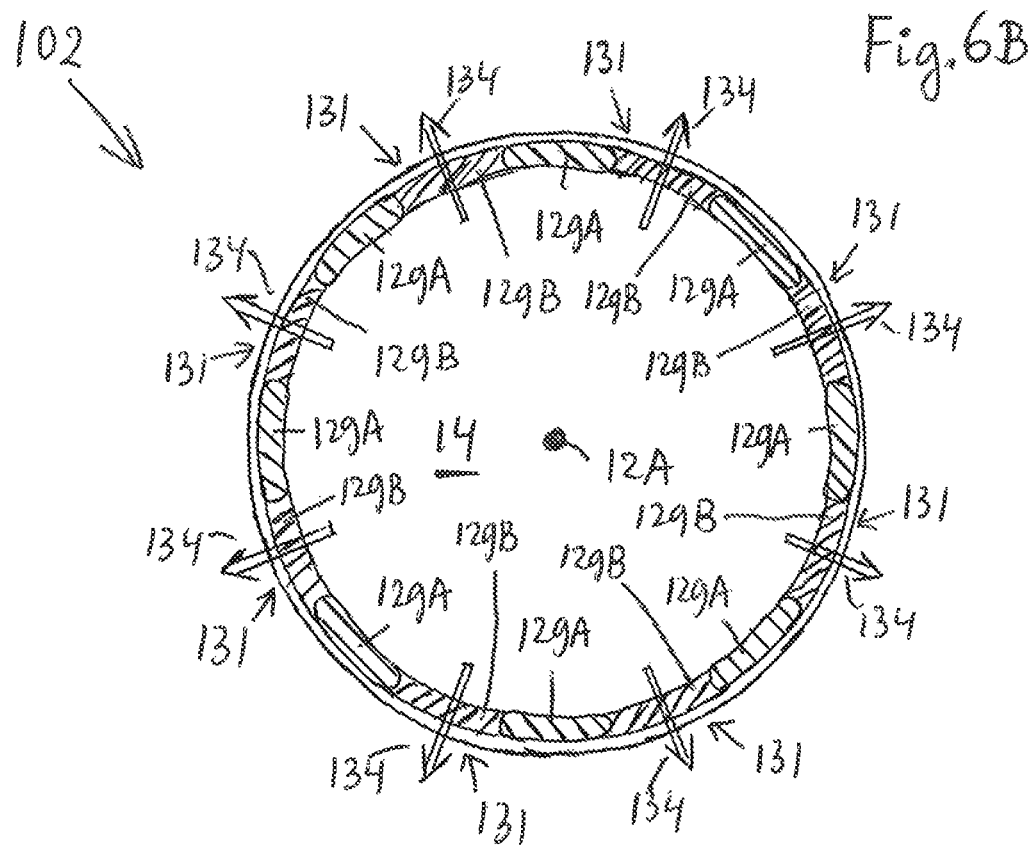

CAPSULE, A SYSTEM FOR PREPARING A POTABLE BEVERAGE FROM SUCH A CAPSULE AND USE OF SUCH A CAPSULE IN A BEVERAGE PREPARATION DEVICE

CROSS-REFERENCE TO RELATED APPLICATIONS

This application is a continuation of International Application No. PCT/NL2017/050300 filed May 15, 2017, which claims priority to Netherlands Application No. NL 2016780 filed on May 13, 2016, the entire contents of all of which are hereby incorporated herein by reference

BACKGROUND

The invention relates to a capsule containing a substance for the preparation of a potable beverage by extracting and/or dissolving the substance by means of supplying a fluid under pressure into the capsule, wherein the capsule comprises an aluminum capsule body having a central capsule body axis, and wherein a circumferential capsule direction of the capsule is extending around said central capsule body axis, said aluminum capsule body being provided with a bottom, a side wall and an outwardly extending flange, the capsule further comprising an aluminum cover attached to the outwardly extending flange, the cover hermetically closing the capsule, wherein the side wall, the bottom and the cover are enclosing an inner space of the capsule, and wherein the cover has an outer cover surface facing away from the inner space, and wherein the capsule further comprises a sealing member at the outwardly extending flange for providing a fluid sealing contact with an enclosing member of a beverage preparation device if the capsule is positioned in the enclosing member of the beverage preparation device and the enclosing member is closed by means of a closing member of the beverage preparation device, such as an extraction plate of the beverage preparation device, such that the outwardly extending flange of the capsule and at least a portion of the sealing member of the capsule are substantially sealingly engaged with the enclosing member of the beverage preparation device, wherein the enclosing member of the beverage preparation device comprises an annular element having a central annular element axis and a free contact end, said free contact end of the annular element optionally being provided with a plurality of radially extending open grooves.

The invention also relates to a system for preparing a potable beverage from a capsule using a fluid supplied under pressure into the capsule comprising:
  a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, said free contact end of the annular element optionally being provided with a plurality of radially extending open grooves;
  a capsule containing a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, and wherein a circumferential capsule direction of the capsule is extending around said central capsule body axis, said aluminum capsule body being provided with a bottom, a side wall and an outwardly extending flange, the capsule further comprising an aluminum cover attached to the outwardly extending flange, the cover hermetically closing the capsule, wherein the side wall, the bottom and the cover are enclosing an inner space of the capsule, and wherein the cover has an outer cover surface facing away from the inner space, and wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are substantially sealingly engaged with the enclosing member of the beverage preparation device.

Furthermore the invention relates to the use of a capsule in a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, said free contact end of the annular element optionally being provided with a plurality of radially extending open grooves; wherein the capsule contains a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, and wherein a circumferential capsule direction of the capsule is extending around said central capsule body axis, said aluminum capsule body being provided with a bottom, a side wall and an outwardly extending flange, the capsule further comprising an aluminum cover attached to the outwardly extending flange, the cover hermetically closing the capsule, wherein the side wall, the bottom and the cover are enclosing an inner space of the capsule, and wherein the cover has an outer cover surface facing away from the inner space, and wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are substantially sealingly engaged with the enclosing member of the beverage preparation device.

A capsule, system and use for preparation of a potable beverage by extracting and/or dissolving a substance by supplying a fluid under pressure into the capsule are known, for example from EP1700548B1.

During use of such a known system, the closing member (e.g. an extraction plate) of the beverage preparation device may undesirably tilt and/or deform relative to the enclosing member of the beverage preparation device. These things usually occur as a result of, for example, uncleanness and/or wear and/or damage of parts of the beverage preparation device, and/or as a result of, for example, the use of a damaged capsule. Also the high fluid pressures occurring during use contribute to such undesirable tiltings and/or deformations of the closing member relative to the enclosing member. In case of such undesirable tiltings and/or deformations, the sealing member of the capsule often will not function as desired, which leads to substantial fluid leakage past certain parts of the sealing member, as well as to decreased quality of the prepared beverage.

SUMMARY

It is an object of the invention to provide a solution according to which the abovementioned unfavourable consequences of undesirable tiltings and/or deformations of the closing member relative to the enclosing member are reduced.

Hence, according to said first aspect of the invention, the invention provides a capsule containing a substance for the preparation of a potable beverage by extracting and/or dissolving the substance by means of supplying a fluid under pressure into the capsule, wherein the capsule comprises an aluminum capsule body having a central capsule body axis, and wherein a circumferential capsule direction of the capsule is extending around said central capsule body axis, said aluminum capsule body being provided with a bottom, a side wall and an outwardly extending flange, the capsule further comprising an aluminum cover attached to the outwardly extending flange, the cover hermetically closing the capsule, wherein the side wall, the bottom and the cover are enclosing an inner space of the capsule, and wherein the cover has an outer cover surface facing away from the inner space, and wherein the capsule further comprises a sealing member at the outwardly extending flange for providing a fluid sealing contact with an enclosing member of a beverage preparation device if the capsule is positioned in the enclosing member of the beverage preparation device and the enclosing member is closed by means of a closing member of the beverage preparation device, such as an extraction plate of the beverage preparation device, such that the outwardly extending flange of the capsule and at least a portion of the sealing member of the capsule are substantially sealingly engaged with the enclosing member of the beverage preparation device, wherein the enclosing member of the beverage preparation device comprises an annular element having a central annular element axis and a free contact end, said free contact end of the annular element optionally being provided with a plurality of radially extending open grooves, characterized in that the capsule further comprises an elastic support structure, which is attached to the outer cover surface of the cover in a support structure attachment area of the outer cover surface, wherein the support structure attachment area, as seen in projection along the central capsule body axis, is extending at least partly along the outwardly extending flange and at least partly in the circumferential capsule direction, in such manner that, if the capsule is freely resting with its elastic support structure on a fully straight reference surface, the elastic support structure provides a spacing between the outwardly extending flange and said fully straight reference surface, said spacing being constant all around in the circumferential capsule direction.

Thanks to the elasticity of the elastic support structure at the outer cover surface of the cover of the capsule, the elastic support structure will automatically adapt to a certain extent to the abovementioned undesirable tiltings and/or deformations of the closing member relative to the enclosing member. That is, in use, certain parts of the elastic support structure will deform more than other parts of the elastic support structure. This means that, despite the undesirable tilting and/or deformation of the closing member relative to the enclosing member, the sealing member at the outwardly extending flange of the capsule will have a better fluid sealing contact with the enclosing member of the beverage preparation device. Hence, this results into reduced fluid leakage past the sealing member at the outwardly extending flange of the capsule.

The elastic support structure can be mounted releasably to the outer cover surface of the cover or fixed thereto, e.g. by welding or by means of an adhesive.

In case the elastic support structure is formed by one or more separate pieces attached to the outer cover surface of the cover, the elastic support structure can be mounted to the capsule as one or more integral pieces. Alternatively it can be applied in fluid or viscous form and then can harden (e.g. polymerize) once applied onto the outer cover surface of the cover, which is the case e.g. when applying silicone.

For the material of the elastic support structure, preferably rubber-elastic materials are used. The term "rubber-elastic" means any suitable material having rubber elasticity including, but not limited to, elastomers, silicones, plastics, latex, balata, or others.

A preferable embodiment of the invention comprises the additional features that, if the capsule is positioned in the enclosing member of the beverage preparation device and the enclosing member is closed by means of the closing member of the beverage preparation device, the elastic support structure along parts of the circumferential capsule direction defines beverage leakage passageways passing at least radially through the elastic support structure and extending between the outer cover surface of the cover of the capsule and the closing member of the beverage preparation device.

It is remarked that, as used herein, a condition in which the capsule is positioned in the enclosing member, while the enclosing member is closed by means of the closing member, as mentioned above, refers to a closing condition in which the corresponding closing force is in the range of 500-8000 N, preferably 1000-4000 N.

Thanks to the beverage leakage passageways passing at least radially through the elastic support structure, there is provided pressure reduction at the downstream end of the fluid path during use. Said pressure reduction at the downstream end of the fluid path automatically alleviates the fluid pressure at more upstream locations of the fluid path, such as at the sealing member at the outwardly extending flange of the capsule, which under circumstances may result into an additional reduction of fluid leakage past the sealing member at the outwardly extending flange of the capsule.

In a "main preferable capsule-embodiment" of a capsule according to the abovementioned first aspect of the invention, the sealing member is integral with the outwardly extending flange and comprises at least one projection projecting from the outwardly extending flange, said at least one projection comprising a projection top, wherein the at least one projection is configured such that its projection top exerts a radial force on the free contact end of the annular element if the capsule is positioned in the enclosing member of the beverage preparation device and the enclosing member is closed by means of the closing member of the beverage preparation device.

The abovementioned main preferable capsule-embodiment is explained as follows.

In the abovementioned system known from EP1700548B1, the capsule is provided with a sealing member having the shape of a step, i.e. a sudden increase of the diameter of the side wall of the capsule, and the enclosing member of this known system has a sealing surface acting on the sealing member to provide deflection of the sealing member, the sealing surface being inclined so that the deflection of the sealing member is an inwards and downwards deformation of the step. Furthermore in the known system the enclosing member comprises a capsule holder and a manually operated or an automatic mechanism for relative displacement of the enclosing member and the capsule holder. The manually operated or an automatic mechanism applies a force on the sealing member of the capsule when the enclosing member closes on the capsule holder. This force should ensure the fluid tight seal between the enclosing member and the capsule. Because the manually operated or an automatic mechanism is arranged to be moved relative to the base, the sealing capabilities of the system can depend on the pressure of the fluid injected by the fluid injection means. If the pressure of the fluid increases, the force between the sealing member of the capsule and the free end of the enclosing member increases too and thereby the force between the sealing member of the capsule and the free end of the enclosing member increases also. The sealing member of the capsule must be arranged such that upon reaching the maximum fluid pressure in the enclosing member the sealing member should still provide a fluid sealing contact between the enclosing member and the capsule. However, the sealing member must also be arranged such that prior to, or at the start of, brewing when the pressure of the fluid in the enclosing member outside the capsule is relatively low, the sealing member also provides a fluid sealing contact between the enclosing member and the capsule. If at the start of brewing, there would not exist a fluid sealing contact between the capsule and the enclosing member, leakage will occur. However, if leakage occurs there is a real chance that the pressure in the enclosing member and outside the capsule will not sufficiently increase for increasing the force on the sealing member by means of the free end of the enclosing member if the manually operated or an automatic mechanism moves the enclosing member towards the capsule holder. Only if there is a sufficient initial sealing, the pressure in the enclosing member will increase whereby also the force of the free end of the enclosing member acting on the sealing member of the capsule will increase for providing a sufficient fluid sealing contact at also the increased fluid pressure. Moreover, this increased fluid pressure outside the capsule also provides an increased fluid pressure inside the capsule which is essential if the capsule is provided with a cover which is arranged to tear open on relief members of the capsule holder (also called an extraction plate) of the beverage preparation device under the influence of fluid pressure in the capsule.

It follows from the above that the sealing member is a member which is very critical in design. It should be able to provide a fluid sealing contact between the enclosing member and the capsule at a relatively low fluid pressure if only a relatively small force is applied on the sealing member by means of the free end of the enclosing member but it should also provide a fluid sealing contact at a much higher fluid pressure in the enclosing member outside the capsule if a higher force is applied by means of the free end of the enclosing member to the sealing member of the capsule. In particular, when the free contact end of the enclosing member is provided with radially extending open grooves which act as air inlet passage once the force between the enclosing member and the capsule holder is released so that it is easier for a user to take out the capsule, the sealing member must also be able to 'close' the radially extending open grooves to provide an effective seal.

It is an object of the abovementioned main preferable capsule-embodiment to provide an alternative sealing member which is relatively easy to manufacture, which is environmentally friendly if the capsule is disposed of after use and/or which provides a satisfactory sealing both at a relatively low fluid pressure if only a relatively small force is applied on the sealing member by means of the free end of the enclosing member (sometimes also called initial seal) and at a much higher fluid pressure if a higher force is applied (e.g. during brewing) by means of the free end of the enclosing member to the sealing member of the capsule, even in case of an enclosing member of which the free contact end is provided with radially extending open grooves.

For that purpose, and as mentioned above, the capsule according the abovementioned main preferable capsule-embodiment is characterized in that the sealing member is integral with the outwardly extending flange and comprises at least one projection projecting from the outwardly extending flange, the at least one projection comprising a projection top, and wherein the at least one projection is configured such that its projection top exerts a radial force on the free contact end of the annular element if the capsule is positioned in the enclosing member of the beverage preparation device and the enclosing member is closed by means of a closing member of the beverage preparation device.

Since the sealing member is integral with the outwardly extending flange and comprises at least one projection of which the top exerts a radial force on the free contact end of the annular element if the capsule is positioned in the enclosing member of the beverage preparation device and the enclosing member is closed by means of a closing member of the beverage preparation device a satisfactory sealing can be obtained. Such a sealing member is relatively easy to manufacture. Furthermore, the capsule can provide a satisfactory sealing with the free contact end provided with radially extending open grooves. In addition, the sealing facilitates positioning of the capsule inside the beverage preparation device.

In this application the existence of a fluid sealing contact means that 0-6%, preferably 0-4%, more preferably 0-2.5% of the total fluid supplied to the enclosing member for preparing the beverage may leak away due to leakage between the free contact end and the sealing member of the capsule.

The invention is in particular advantageous when in an embodiment of a capsule the capsule contains an extractable product as substance for the preparation of a potable beverage, the extractable product preferably being 5-20 grams, preferably 5-10 grams, more preferably 5-7 grams of an extractable product, such as roasted and ground coffee.

In an embodiment of a capsule according to the invention which is in particular easy to manufacture the outer diameter of the outwardly extending flange of the capsule is larger than the diameter of the bottom of the capsule. Preferably, the outer diameter of the outwardly extending flange is approximately 37.1 mm and the diameter of the bottom of the capsule is about 23.3 mm.

The invention is in particular advantageous when in an embodiment of a capsule the thickness of the aluminum capsule body is such that it is deformed easily if the capsule is positioned in the enclosing member of the beverage preparation device and the enclosing member is closed by means of a closing member of the beverage preparation device, preferably the thickness of the aluminum capsule body is 20 to 200 micrometer, preferably 100 micrometer.

The invention is in particular advantageous when in an embodiment of a capsule the thickness of the aluminum cover is 15 to 65 micrometer, preferably 30-45 micrometer and more preferably 39 micrometer.

In an embodiment of a capsule according to the invention the wall thickness of the aluminum cover is smaller than the wall thickness of the aluminum capsule body.

In a further embodiment of a capsule according to the invention the aluminum cover is arranged to tear open on a closing member of the beverage preparation device, such as an extraction plate of the beverage preparation device under the influence of fluid pressure in the capsule.

In an embodiment of a capsule according to the invention which is in particular easy to manufacture the side wall of the aluminum capsule body has a free end opposite the bottom, the outwardly extending flange extending from the free end of the side wall in a direction at least substantially transverse to the central capsule body axis. Preferably, the outwardly extending flange comprises a curled outer edge, which is beneficial in obtaining for a satisfactory sealing with the free contact end provided with radially extending open grooves. The radius about the central capsule body axis of an inner edge of the curled outer edge of the outwardly extending flange is preferably at least 32 mm, so that clearance from the annular end surface of the enclosure member is ensured. It is then preferred that the sealing member is positioned between the free end of the side wall of the aluminum capsule body and an inner edge of the curled outer edge of the outwardly extending flange to obtain a still further satisfactory sealing.

To ensure that the curled outer edge does not interfere with operation of a wide variety of commercially available and future beverage preparation apparatuses, the curled outer edge of the outwardly extending flange has a largest dimension of about 1.2 millimeter.

The invention is in particular beneficial for capsules of which the inner diameter of the free end of the side wall of the aluminum capsule body is about 29.5 mm. The distance between the free end of the side wall of the aluminum capsule body and an outermost edge of the outwardly extending flange can be about 3.8 millimeter. The preferred height of the aluminum capsule body is about 28.4 mm.

In an embodiment of a capsule according to the invention which after use is easier for a user to take out of a beverage preparation device the aluminum capsule body is truncated, wherein preferably the side wall of the aluminum capsule body encloses an angle with a line transverse to the central capsule body axis of about 97.5°.

In an advantageous embodiment of a capsule according to the invention the bottom of the aluminum capsule body has a largest inner diameter of about 23.3 mm. It is preferred that the bottom of the aluminum capsule body is truncated, preferably having a bottom height of about 4.0 mm and that the bottom further has a generally flat central portion opposite the cover having a diameter of about 8.3 mm.

In practically all cases a satisfactory seal can be obtained in an embodiment of a capsule according to the invention in which the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm.

In a preferred embodiment of a capsule according to the invention the capsule comprises an inner surface, and wherein on the inner surface of at least the side wall of the capsule an inner coating is provided. In particular, when the capsule is manufactured by deep drawing the inner coating facilitates the deep drawing process. In case the aluminum cover of the capsule is attached to the outwardly extending flange by means of a sealing lacquer it is then in particular advantageous when the inner coating being composed of the same material as the sealing lacquer. In dependence of the inner coating used it is preferred that the sealing member is free from an inner coating in order to prevent crumbling off of the inner coating from the sealing member.

In a further embodiment of a capsule according to the invention the capsule comprises an outer surface, wherein on the outer surface of the capsule a color lacquer is provided. In order to facilitate in deep drawing it is preferred to provide on an outer surface of the color lacquer an outer coating. In dependence of the color lacquer and outer coating used it is preferred that the sealing member is free from a color lacquer (and consequently the outer coating) in order to prevent crumbling off of the color lacquer/outer coating from the sealing member.

In a still further embodiment of a capsule according to the invention the at least one projection comprises a projection side wall which is inclined with regard to the outwardly extending flange of the aluminum capsule body, the projection side wall being configured such that it is deformed easily if the capsule is positioned in the enclosing member of the beverage preparation device and the enclosing member is closed by means of a closing member of the beverage preparation device. This improves the force exerted on the free contact end and thus improves the sealing. It is then preferred when the distance between the projection and the side wall of the aluminum capsule body is such that the free contact end of the annular element is contacted by the projection and the side wall of the aluminum capsule body if the capsule is positioned in the enclosing member of the beverage preparation device and the enclosing member is closed by means of a closing member of the beverage preparation device.

In an advantageous embodiment of a capsule according to the invention the sealing member in addition to the at least one projection projecting from the outwardly extending flange comprises a plateau between the projection top and the side wall of the aluminum capsule body. It is beneficial for providing a seal when a bearing is formed by the projection, plateau and the side wall of the aluminum capsule body, wherein the distance between the projection and the side wall is such that the free contact end of the annular element is enclosed by the projection and the side wall of the aluminum capsule body if the capsule is positioned in the enclosing member of the beverage preparation device and the enclosing member is closed by means of a closing member of the beverage preparation device.

The projection, the side wall of the aluminum capsule body and the plateau can be arranged such that the free contact end of the annular element is contacted by the plateau if the capsule is positioned in the enclosing member of the beverage preparation device and the enclosing member is closed by means of a closing member of the beverage preparation device.

Alternatively the sealing member can comprise two spaced projections, each projecting from the outwardly extending flange and a plateau between the two projections, wherein the distance between the two projections is such that the free contact end of the annular element is squeezed between converging surfaces of the two projections if the capsule is positioned in the enclosing member of the beverage preparation device and the enclosing member is closed by means of a closing member of the beverage preparation device. It is then preferred when the distance between the two projections is such that the free contact end of the annular element is contacted by the two projections if the capsule is positioned in the enclosing member of the beverage preparation device and the enclosing member is closed by means of a closing member of the beverage preparation device. In particular, a satisfactory seal can be obtained when the two spaced projections and the plateau are arranged such that the free contact end of the annular element is contacted by the plateau if the capsule is positioned in the enclosing member of the beverage preparation device and the enclosing member is closed by means of a closing member of the beverage preparation device. The capsule can preferably comprise a bearing for the enclosing member of the beverage preparation device if the capsule is positioned in the enclosing member of the beverage preparation device and the enclosing member is closed by means of a closing member of the beverage preparation device, the bearing enclosing at least a portion of the free contact end of the annular element and the bearing being formed by the two projections and the plateau there between.

The plateau can be substantially flat or can comprise a curved portion. In particular advantageous is the embodiment of a capsule according to the invention in which the plateau is V-shaped. In this manner the free contact end of the annular member is squeezed between the two projections providing a satisfactory seal.

A further object of embodiments of the invention is to achieve reliable low and high pressure sealings against the free contact end of the enclosing member, in particular with little sensitivity to variations in diameter, thickness and shape of the of the free contact end, which occur between different models of brewing systems, and non-circularity (e.g. ovality) of the free contact end and/or of the flange of the capsule. The latter may for instance result from compression of capsules in a shopping bag or trolley. In an embodiment of the invention, this object is achieved by providing that a first one of the two projections projects further from a base portion of the outwardly extending flange, to which base portion the cover is attached, than a second one of the two projections.

When the enclosing member closes, if a too large portion of the one of the projections projecting furthest from the base portion is located under the axially in line with the free contact end, it is urged away radially so that the free contact end passes alongside that furthest projecting one of the projections. This radial displacement also entrains the other one of the projections radially towards the free contact end, so that it is accurately positioned for firm sealing engagement with the free contact end. Moreover, the furthest projecting one of the projections is deformable in radial sense over a relatively large distance, so that it can accommodate to relatively large deviations, while the other one of the projections is relatively stiff, which is advantageous for exerting a firm sealing pressure.

If the first one of the projections is the inner one of the two projections, the capsule is particularly suitable for use in commercially available apparatuses such as the Citiz, Lattisima, U, Maestria, Pixie, Inissia and Essenza in which the free contact end of the annular element is provided with the plurality of radially extending open grooves, the grooves being deeper in the inner surface portion than in the outer surface portion of the free contact end or the grooves being absent in the outer surface portion of the free contact end. In such apparatuses, a reliable and accurately positioned seal is obtained between the second one of the projections and the relatively smooth outer surface portion of the free contact end.

For achieving a reliable seal, it is also advantageous if the first one of the two projections has an extreme top end extending around the capsule axis at a diameter of 31.9 to 32.4 mm and the second one of the two projections has an extreme top end extending around the capsule axis at a diameter of 29.2 to 29.8 mm. Thus, when used in commercially available coffee making apparatuses such as the Citiz, Lattisima, U, Maestria, Pixie, Inissia and Essenza, an outer edge area of the free end of the enclosing member is firmly pressed against the second projection.

If the plateau is axially spaced from the cover, this area between the first and second projections is displaced axially towards the cover as the enclosing member is closed by means of the closing member of the beverage preparation device. This causes the first projection and the second projection to deform towards the free contact end of the annular element, due to tilting and "rolling off" of the first projection and the second projection, thereby increasing the radial contact pressure exerted against the free contact end of the annular element, which contributes to achieving a satisfactory seal.

In a "main preferable system-embodiment" of a system according to the abovementioned second aspect of the invention, the sealing member is integral with the outwardly extending flange and comprises at least one projection projecting from the outwardly extending flange, said at least one projection comprising a projection top, and wherein the at least one projection is configured such that its projection top exerts a radial force on the free contact end of the annular element if the capsule is positioned in the enclosing member of the beverage preparation device and the enclosing member is closed by means of the closing member of the beverage preparation device.

Since the sealing member is integral with the outwardly extending flange and comprises at least one projection of which the top exerts a radial force on the free contact end of the annular element if the capsule is positioned in the enclosing member of the beverage preparation device and the enclosing member is closed by means of a closing member of the beverage preparation device a satisfactory sealing can be obtained. Such a sealing member is relatively easy to manufacture. Furthermore, the capsule can provide a satisfactory sealing with the free contact end provided with radially extending open grooves.

The projection or projections may project from at least one base portion of the flange to which base portion the cover is attached. The projection or projections may project axially from the base portion in a direction away from the cover. The projection top may constitute a portion of the projection, for instance a half, a third or a quarter of the projection, that is axially most distal from the base portion.

Regarding the preferred embodiments of the system as mentioned in the dependent claims which relate to the same features as the features of the dependent claims of the capsule reference is made to the above.

The invention is particularly suitable in a system according to the invention wherein, in use, the maximum fluid pressure in the enclosing member of the beverage preparation device is in the range of 6-20 bar, preferably between 12 and 18 bar. Even at such high pressures a satisfactory seal between capsule and beverage preparation device can be obtained.

Preferably the system is arranged such that, in use, during brewing, a free end of the enclosing member of the beverage preparation device exerts a force F2 on the sealing member of the capsule to provide a fluid sealing contact between the outwardly extending flange of the capsule and the enclosing member of the beverage preparation device, wherein F2 is in the range of 500-1500 N preferably in the range of 750-1250 N when the fluid pressure P2 in the enclosing member of the beverage preparation device outside the capsule is in the range of 6-20 bar, preferably between 12 and 18 bar. In particular the system is arranged such that, in use, prior to or at the start of brewing, a free end of the enclosing member of the beverage preparation device exerts a force F1 on the sealing member of the capsule to provide a fluid sealing contact between the outwardly extending flange of the capsule and the enclosing member of the beverage preparation device, wherein F1 is in the range of 30-150 N preferably in the range of 40-150 N, more preferably 50-100 N, when the fluid pressure P1 in the enclosing member of the beverage preparation device outside the capsule is in the range of 0.1-4 bar, preferably between 0.1-1 bar.

In an embodiment of a system according to the invention wherein the plurality of radially extending open grooves are uniformly spaced relative to each other in tangential direction of the free contact end of the annular element of the beverage preparation device so that it is easier for a user to take out the capsule while a satisfactory seal between capsule and beverage preparation device can still be provided.

In an advantageous embodiment of a system according to the invention the longest tangential width of each groove (top to top, i.e. equal to the groove to groove pitch) is 0.9-1.1 mm, preferably 0.95 to 1.05 mm, more preferably 0.98 to 1.02 mm, wherein a maximal height of each groove in an axial direction of the enclosing member of the beverage preparation device is 0.01-0.09 mm, preferably 0.03 to 0.07 mm, more preferably 0.045 to 0.055 mm, most preferred 0.05 mm and wherein the number of grooves is 90 to 110, preferably 96. The radial width of the annular end surface at the location of the grooves may for instance be 0.05-0.9 mm, preferably 0.2-0.7 mm and more preferably 0.3-0.55 mm. The invention is in particular suitable when applied to an embodiment of a system according to the invention in which during use when the closing member of the beverage preparation device closes the enclosing member of the beverage preparation device at least the free contact end of the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free end of the enclosing member of the beverage preparation device. The enclosing member may comprise a first part and a second part wherein the second part comprises the free contact end of the enclosing member wherein the second part can move relative to the first part between a first and second position. The second part can move from the first positon towards the second position in the direction of the closing member under the influence of fluid pressure in the enclosing member. The force F1 as discussed above may be reached if the second part is in the first position with a fluid pressure P1. The force F2 as discussed above may be reached if the second part is moved towards the second position under the influence of the fluid pressure P2 in the enclosing member.

Regarding the advantages of a use of a capsule according to the abovementioned third aspect of the invention, and of the preferred embodiments of the use as mentioned in the appended dependent claims which correspond to the features of the appended dependent claims of the capsule or of the appended dependent claims of the system, reference is made to the above.

BRIEF DESCRIPTION OF THE DRAWINGS

The invention will now be further elucidated by means of, non-limiting, examples referring to the drawing, in which:

FIG. 6A shows in side view a further example of a capsule according to the invention, based on a second embodiment of the elastic support structure of the capsule; and FIG. 6B shows the example of FIG. 6A in an orthogonal view onto the outer cover surface of the cover of the capsule.

DETAILED DESCRIPTION

Figure 1:
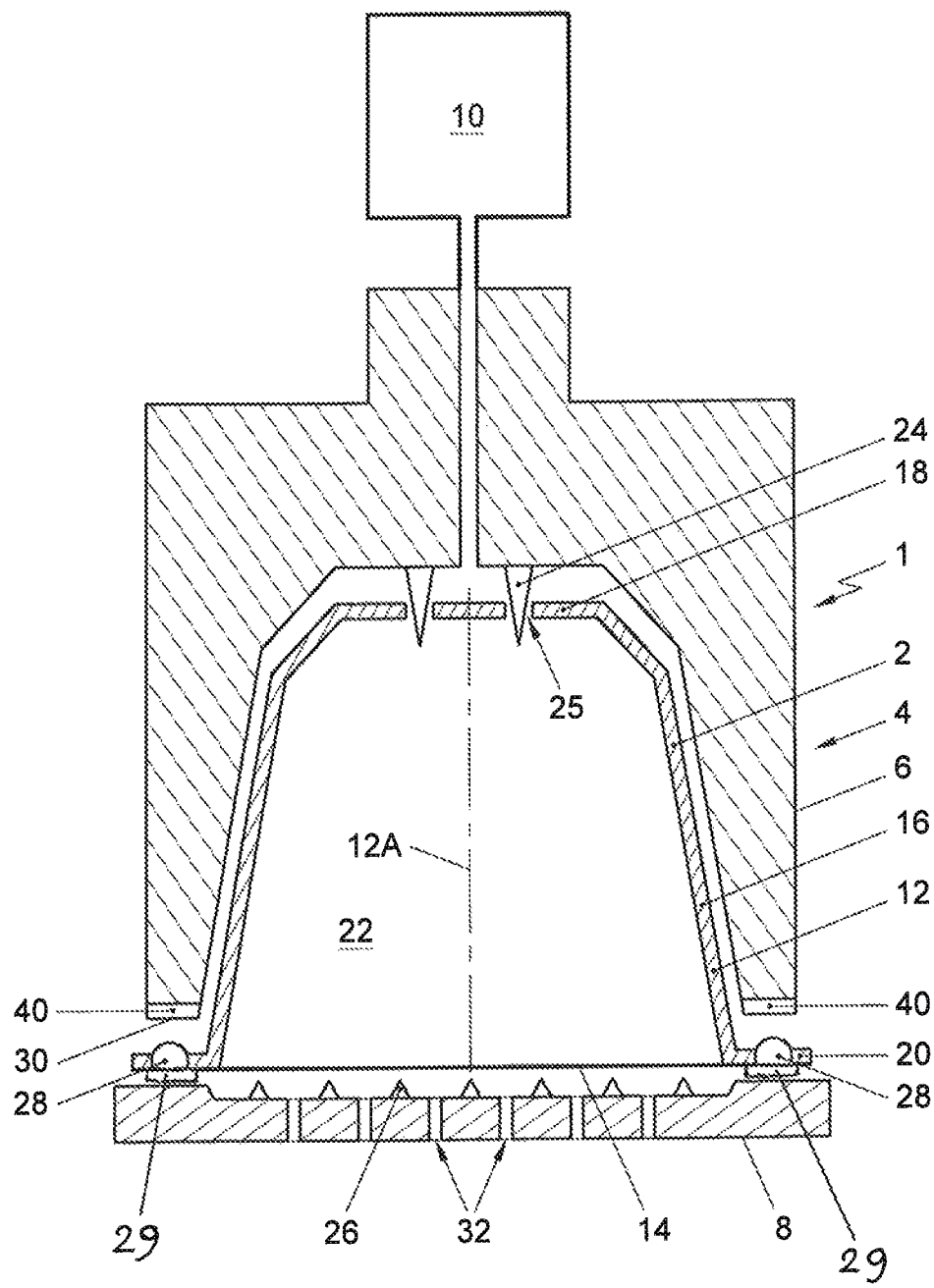
FIG. 1 shows a schematic representation of an embodiment of a system according to the invention.

In the figures and the following description, like reference numerals refer to like features.

FIG. 1 shows a schematic representation, in cross sectional view, of an embodiment of a system 1 for preparing a potable beverage from a capsule using a fluid supplied under pressure into the capsule. The system 1 comprises a capsule 2, and a beverage preparation device 4. The device 4 comprises enclosing member 6 for holding the capsule 2. The device 4 further comprises a closing member, such as an extraction plate, 8 for supporting the capsule 2.

In FIG. 1 a gap is drawn between the capsule 2, the enclosing member 6 and the extraction plate 8 for clarity. It will be appreciated that, in use, the capsule 2 may lie in contact with the enclosing member 6 and the extraction plate member 8. Commonly, the enclosing member 6 has a shape complementary to the shape of the capsule 2. The beverage preparation device 4 further comprises a fluid injection means 10 for supplying an amount of a fluid, such as water, under a pressure in the range of 6-20 bar, preferably between 12 and 18 bar, to the exchangeable capsule 2.

In the example shown in FIG. 1, the exchangeable capsule 2 comprises an aluminum capsule body 12 having a central capsule body axis 12A and an aluminum cover 14. In the present context, the meaning of 'aluminum' is understood to also include aluminum alloy. In this example, the aluminum capsule body 12 comprises a side wall 16, a bottom 18 closing the side wall 16 at a first end, and a outwardly extending flange 20 extending outwardly of the circumferential wall 16 at a second end opposite the bottom 18. The side wall 16, the bottom 18 and the cover 14 enclose an inner space 22 comprising a substance for the preparation of a potable beverage by extracting and/or dissolving the substance. Preferably the substance is an extractable product for the preparation of a potable beverage, the extractable product preferably being 5-20 grams, preferably 5-10 grams, more preferably 5-7 grams of roasted and ground coffee for the preparation of a single beverage. The capsule is initially sealed, i.e. is hermetically closed prior to use.

The system 1 of FIG. 1 comprises bottom piercing means 24 for piercing the bottom 18 of the capsule 2 for creating at least one entrance opening 25 in the bottom 18 for supplying the fluid to the extractable product through the entrance opening 25.

The system 1 of FIG. 1 further comprises cover piercing means 26, here embodied as protrusions of the closing member 8, for piercing the cover 14 of the capsule 2. The cover piercing means 26 may be arranged to tear the cover 14 once a (fluid) pressure inside the inner space 22 exceeds a threshold pressure and presses the cover 14 against the cover piercing means 26 with sufficient force. The aluminum cover 14 thus is arranged to tear open on the closing member 8 of the beverage preparation device under the influence of fluid pressure in the capsule.

Figure 3A:
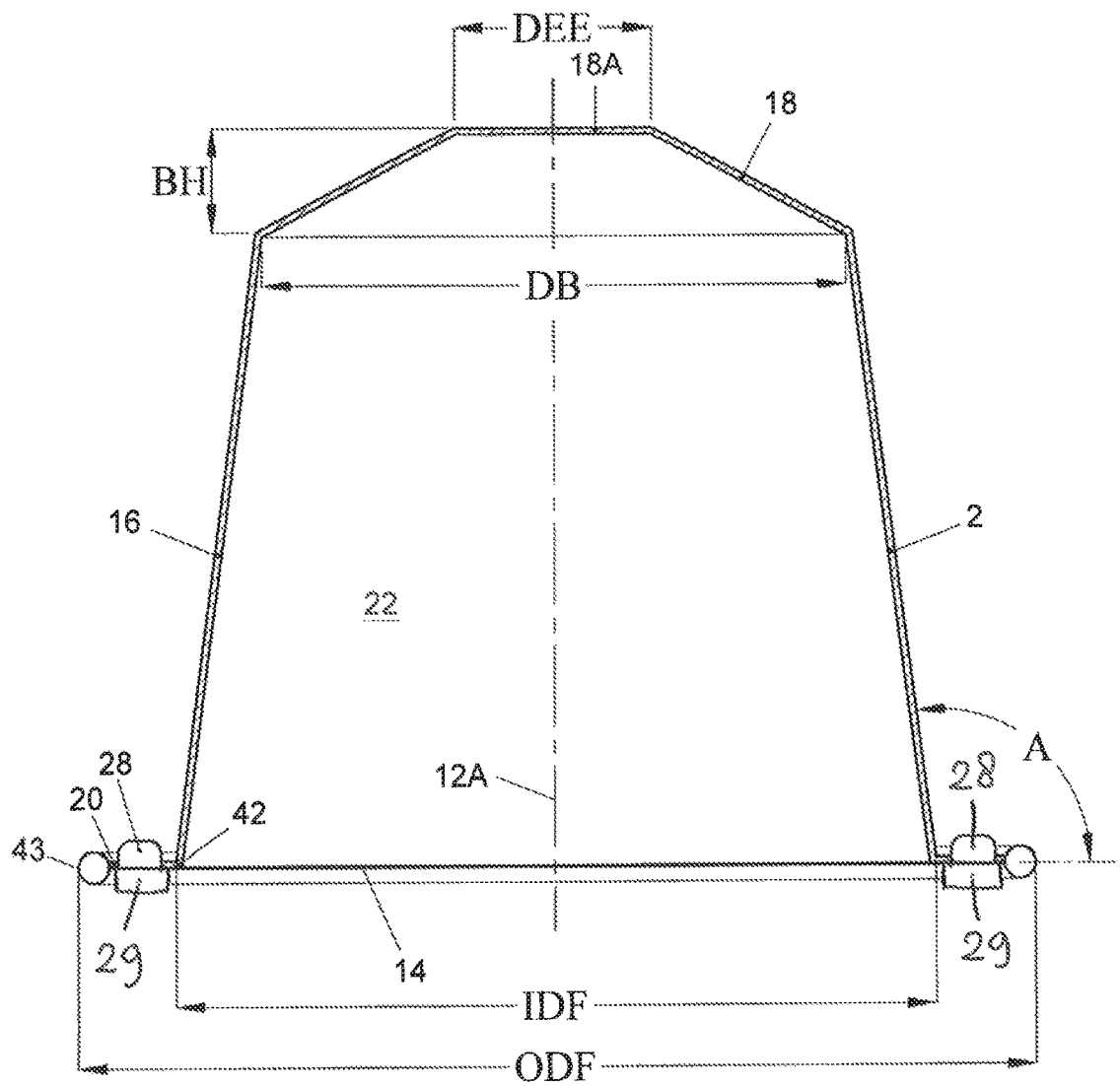
FIG. 3A in cross section shows an embodiment of a capsule according to the invention before use.
Figure 3B:
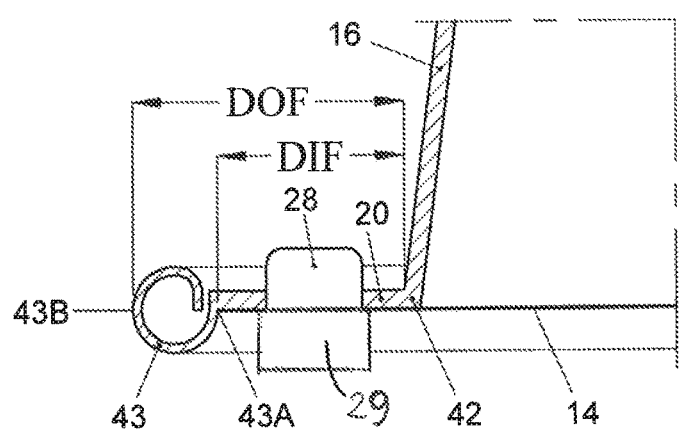
FIG. 3B shows an enlarged detail of the capsule of FIG. 3A showing the outwardly extending flange and the sealing member.

The capsule 2 further comprises a sealing member 28 integral with the outwardly extending flange, in FIGS. 1, 3A and 3B indicated as a general box but more detailed described with regard to FIG. 4, which sealing member 28 is arranged for providing a fluid sealing contact with the enclosing member 6 if the capsule 2 is positioned in the enclosing member 6 and the enclosing member 6 is closed by means of the extraction plate 8, such that the outwardly extending flange 20 of the capsule 2 and at least a portion of the sealing member 28 are sealingly engaged between the enclosing member 6 and the extraction plate 8. This means that a fluid sealing contact between the sealing member and the free contact end is established.

The capsule 2 further comprises an elastic support structure 29, which is attached to the outer cover surface of the cover 14, wherein the outer cover surface is facing away from the inner space 22. In FIGS. 1, 3A-3B, 4A-4G this elastic support structure 29 is indicated as a general box 29, but it is shown and described in more detail with reference to FIGS. 5A-5B and FIGS. 6A-6B.

Figure 2:
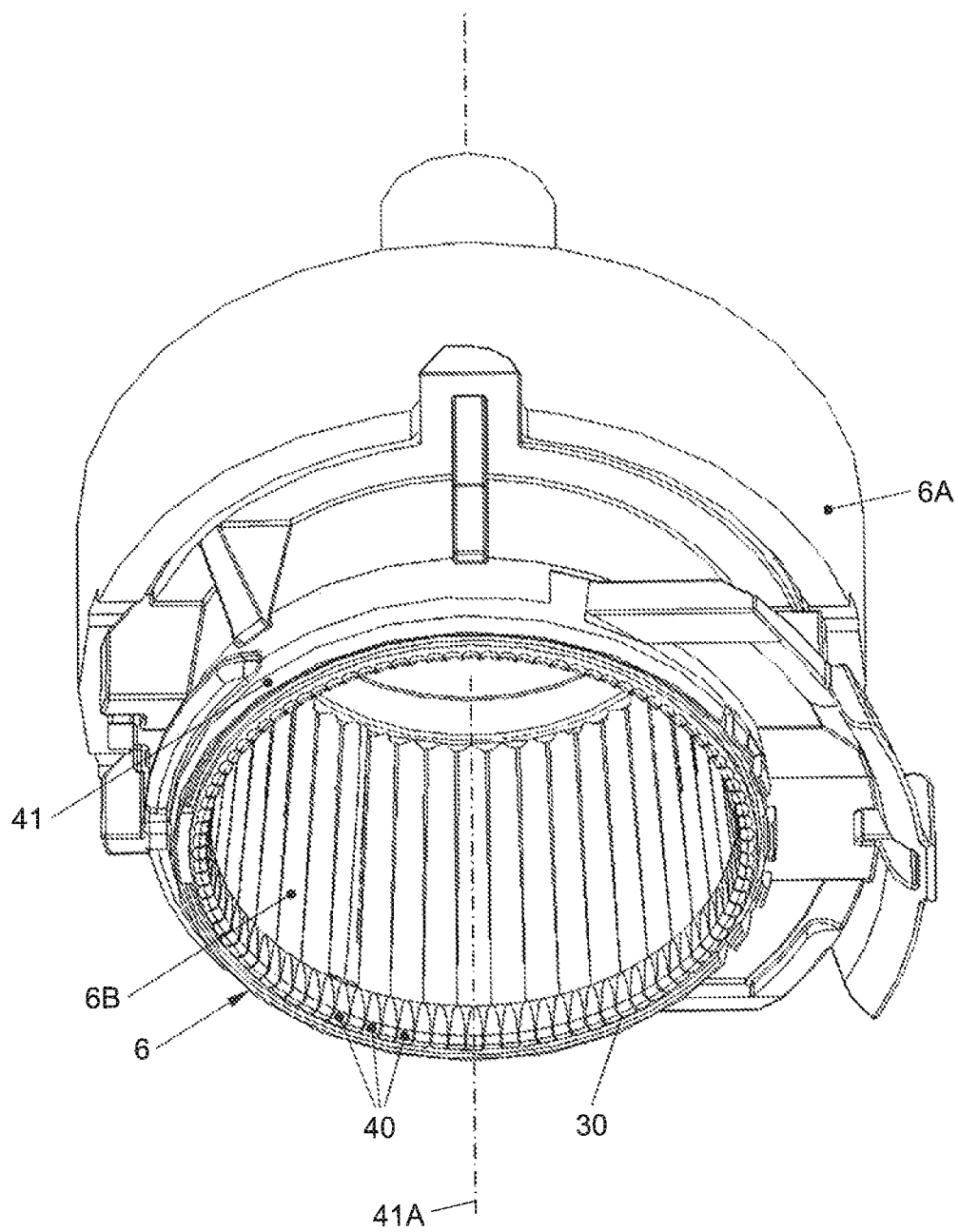
FIG. 2 in a perspective view shows an embodiment of a beverage preparation device of a system according to the invention showing the free contact end of the enclosing member of the beverage preparation device with the plurality of radially extending open grooves.

As shown in FIG. 2 the enclosing member 6 of the beverage preparation device comprises an annular element 41 having a central annular element axis 41A and a free contact end 30. The free contact end 30 of the annular element 41 is provided with a plurality of radially extending open grooves 40. The plurality of radially extending open grooves 40 are uniformly spaced relative to each other in tangential direction of the free contact end 30 of the annular element 41. The longest tangential width of each groove 40 is 0.9-1.1 mm, preferably 0.95 to 1.05 mm, more preferably 0.98 to 1.02 mm, wherein a maximal height of each groove 40 in an axial direction of the enclosing member 6 is 0.01-0.09 mm, preferably 0.03 to 0.07 mm, more preferably 0.045 to 0.055 mm, and most preferred 0.05 mm. The number of grooves 40 lies in the range of 90 to 110, preferably 96. Usually, the radial width of the free end at the location of the grooves is 0.05-0.9 mm, more specifically 0.2-0.7 mm, more specifically 0.3-0.55 mm.

An embodiment of a capsule according to the invention is shown more detailed in FIGS. 3A and 3B. In the shown embodiment the outer diameter ODF of the outwardly extending flange 20 is larger than the diameter DB of the bottom 18 of the capsule 2. In the shown embodiment the outer diameter ODF of the outwardly extending flange 20 is approximately 37.1 mm and the diameter DB of the bottom 18 is about 23.3 mm. The thickness of the aluminum capsule body 12 is such that it is deformed easily if the capsule is positioned in the enclosing member of the beverage preparation device and the enclosing member is closed by means of a closing member of the beverage preparation device, preferably the thickness of the aluminum capsule body is 100 micrometer, but in other embodiments the thickness can be 20 to 200 micrometer.

In the shown embodiment, the wall thickness of the aluminum cover 14 is 39 micrometer. The wall thickness of the aluminum cover 14 is preferably smaller than the thickness of the aluminum capsule body 12.

The side wall 16 of the aluminum capsule body 12 has a free end 42 opposite the bottom 18. The inner diameter IDF of the free end 42 of the side wall 16 of the aluminum capsule body 12 is about 29.5 mm. The outwardly extending flange 20 extends from that free end 42 in a direction at least substantially transverse to the central capsule body axis 12A. The outwardly extending flange 20 comprises a curled outer edge 43 which is beneficial for obtaining a seal between the capsule and the enclosing member. In the shown embodiment the curled outer edge 43 of the outwardly extending flange 20 has a largest dimension of about 1.2 millimeter. The distance DIF between the free end 42 of the side wall 16 of the aluminum capsule body 12 and an inner edge 43A of the curled outer edge 43 is about 2.7 mm, while the distance DOF between the free end 42 of the side wall 16 of the aluminum capsule body 12 and an outermost edge 43B of the outwardly extending flange 20 is about 3.8 millimeter. The radius about the central capsule body axis of the inner edge 43A of the curled outer edge 43 is preferably at least 32 mm.

As shown in FIGS. 3A and 3B the sealing member 28 is positioned between the free end of the side wall 16 of the aluminum capsule body 12 and the inner edge 43A of the curled outer edge 42 of the outwardly extending flange. The sealing member 28 is indicated as a general box, but will be described in more detail below. Irrespective of the embodiment of the sealing member 28 the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm for providing a correct seal.

As can be seen from FIG. 3A the aluminum capsule body 12 is truncated. In the embodiment shown, the side wall 16 of the aluminum capsule body 12 encloses an angle A with a line transverse to the central capsule body axis 12A of about 97.5°. The bottom 18 of the aluminum capsule body 12 has a largest inner diameter DB of about 23.3 mm. The bottom 18 of the aluminum capsule body 12 is also truncated, and in the shown embodiment has a bottom height BH of about 4.0 mm. The bottom 18 further has a generally flat central portion 18A opposite the cover 14, which central portion 18A has a diameter DEE of about 8.3 mm and in which central portion 18A the entrance opening(s) 25 may be made. The entrance openings may also be made in the truncated portion between the central portion 18A and the side wall 16. The total height TH of the aluminum capsule body 12 of the capsule is about 28.4 mm.

The system 1 shown in FIG. 1 is operated as follows for preparing a cup of a potable beverage, in the present example coffee, wherein the substance is roasted and ground coffee.

The capsule 2 is placed in the enclosing member 6. The extraction plate 8 is brought into contact with the capsule 2. The bottom piercing means 24 pierce the bottom 18 of the capsule 2 for creating the entrance openings 25. The fluid, here hot water under pressure, is supplied to the extractable product in the inner space 22 through the entrance openings 25. The water will wet the coffee grounds and extract the desired substances to form the coffee beverage.

During supplying the water under pressure to the inner space 22, the pressure inside the capsule 2 will rise. The rise in pressure will cause the cover 14 to deform and be pressed against the lid piercing means 26 of the extraction plate. Once the pressure reaches a certain level, the tear strength of the cover 14 will be surpassed and the cover 14 will rupture against the lid piercing means 26, creating exit openings. The prepared coffee will drain from the capsule 2 through the exit openings and outlets 32 (see FIG. 1) of the extraction plate 8, and may be supplied to a container such as a cup (not shown).

The system 1 is arranged such that prior to or at the start of brewing, the free end 30 of the enclosing member 6 exerts a force F1 on the sealing member 28 of the capsule 2 to provide a fluid sealing contact between the outwardly extending flange 20 of the capsule 2 and the enclosing member 6 of the beverage preparation device, wherein F1 is in the range of 30-150 N preferably 40-150 N, more preferably 50-100 N, when the fluid pressure P1 in the enclosing member 6 of the beverage preparation device outside the capsule is in the range of 0.1-4 bar, preferably 0.1-1 bar. During brewing, the free end 30 of the enclosing member 6 exerts a force F2 on the sealing member 28 of the capsule 2 to provide a fluid sealing contact between the outwardly extending flange 20 of the capsule 2 and the enclosing member 6, wherein the force F2 is in the range of 500-1500 N, preferably in the range of 750-1250 N, when the fluid pressure P2 in the enclosing member 6 of the beverage preparation device outside the capsule 2 is in the range of 6-20 bar, preferably between 12 and 18 bar. In the shown embodiment the free contact end of enclosing member 6 can move relative to the extracting plate 8 under the effect of the pressure of the fluid in the enclosing member 6 device towards the extraction plate 8 for applying the maximum force F2 between the outwardly extending flange 20 and the free end 30 of the enclosing member 6. This movement can take place during use, i.e. in particular at the start of brewing and during brewing. The enclosing member 6 has a first part 6A and a second part 6B wherein the second part comprises the free contact end 30. The second part 6B can move relative to the first part 6A between a first and second position. The second part 6B can move from the first positon towards the second position in the direction of the closing member 8 under the influence of fluid pressure in the enclosing member 6. The force F1 as discussed above may be reached if the second part 6B is in the first position with a fluid pressure P1. The force F2 as discussed above may be reached if the second part 6B is moved towards the second position under the influence of the fluid pressure P2 in the enclosing member 6.

Figure 3C:
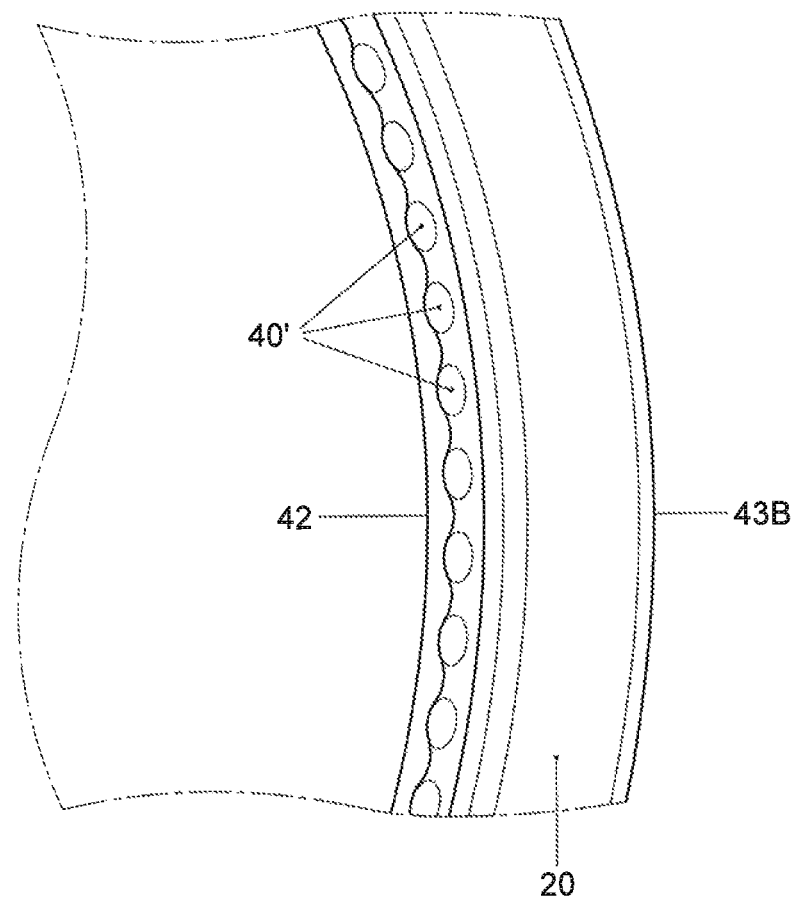
FIG. 3C shows an enlarged detail of the outwardly extending flange of the capsule in FIGS. 3A and 3B after use.

As a result of the force applied the sealing member 28 of the capsule according to the invention undergoes a plastic deformation and closely conforms to the grooves 40 of the free contact end 30 and thus provides a fluid sealing contact between the enclosing member 6 and the capsule 3 at a relatively low fluid pressure during start up of brewing but also provides a fluid sealing contact at the much higher fluid pressure in the enclosing member outside the capsule during brewing. This close conformation to the grooves 40 of the enclosing member is indicated in FIG. 3C which shows the capsule 2 of the invention after use, and which clearly indicates that the outwardly extending flange 20 comprises deformations 40' which conform to the grooves 40 of the enclosing member.

Now exemplary embodiments of a sealing member 28 at the outwardly extending flange 20 of the capsule 2 according to the invention will be described in more detail with regard to FIG. 4.

Figure 4A:
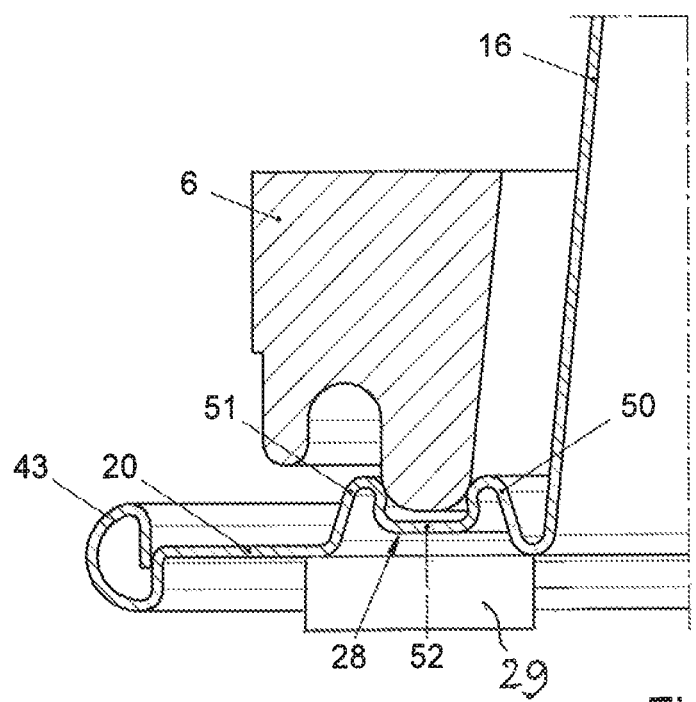
FIG. 4A shows a first embodiment of a sealing member at the outwardly extending flange of a capsule according to the invention.

FIG. 4A shows a first embodiment of a sealing member 28 forming an additional bearing at the outwardly extending flange 20 of a capsule 2 according to the invention. The sealing member and the remainder of the capsule body are made of the same plate material. The sealing member 28 comprises two spaced projections 50 and 51, each projecting axially from a base portion of the outwardly extending flange 20, to which base portion the cover 14 is attached, in a direction away from the cover 14. A plateau 52 is present between the two projections 50 and 51. The distance between the two projections 50 and 51 is such that the free contact end of the annular element 6 is squeezed between converging surfaces of the two projections 50 and 51 if the capsule is positioned in the enclosing member of the beverage preparation device and the enclosing member is closed by means of a closing member of the beverage preparation device. In the embodiment shown in FIG. 4A the plateau is positioned at a distance above the portion of the outwardly extending flange 20 between the sealing member 28 and the curled edge 43 and is substantially flat. The distance between the two projections 50 and 51 is further such that the free contact end of the annular element is contacted by the two projections 50 and 51 if the capsule is positioned in the enclosing member of the beverage preparation device and the enclosing member is closed by means of a closing member of the beverage preparation device. Further, the two spaced projections 50, 51 and the plateau 52 are arranged such that the free contact end of the annular element is contacted by the plateau if the capsule is positioned in the enclosing member of the beverage preparation device and the enclosing member is closed by means of a closing member of the beverage preparation device. As can be seen in FIG. 4A each projection 50, 51 comprises a projection side wall which is inclined with regard to the outwardly extending flange 20 of the aluminum capsule body. The projection side wall is configured such that it is deformed easily if the capsule is positioned in the enclosing member of the beverage preparation device and the enclosing member is closed by means of a closing member of the beverage preparation device.

Figure 4B:
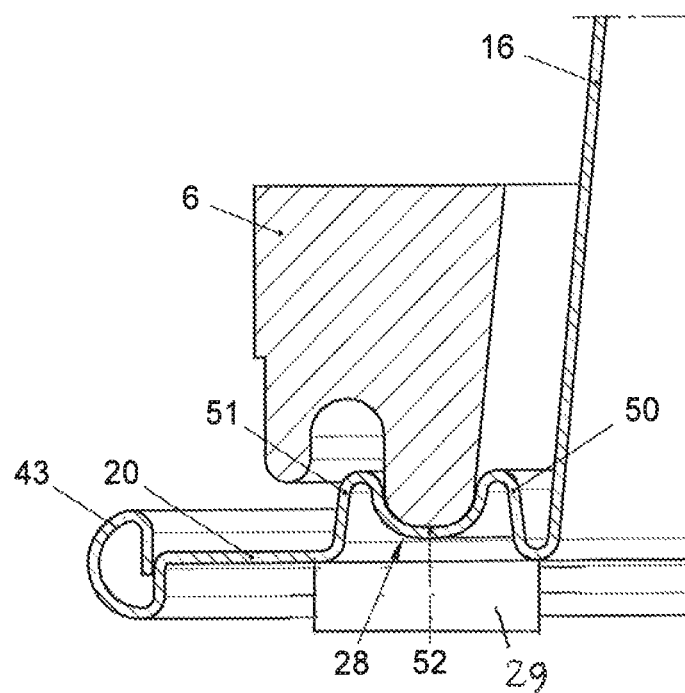
FIG. 4B shows a second embodiment of a sealing member at the outwardly extending flange of a capsule according to the invention.

FIG. 4B shows a second embodiment of a sealing member 28 at the outwardly extending flange 20 of a capsule according to the invention. When compared with FIG. 4A the following differences are noted. Each projection 50, 51 now comprises a projection side wall which is transverse with regard to the outwardly extending flange 20 of the aluminum capsule body. Further, in this second embodiment the plateau 52 is curved, preferably conforming to the shape of the free contact end of the annular element 6.

Figure 4C:
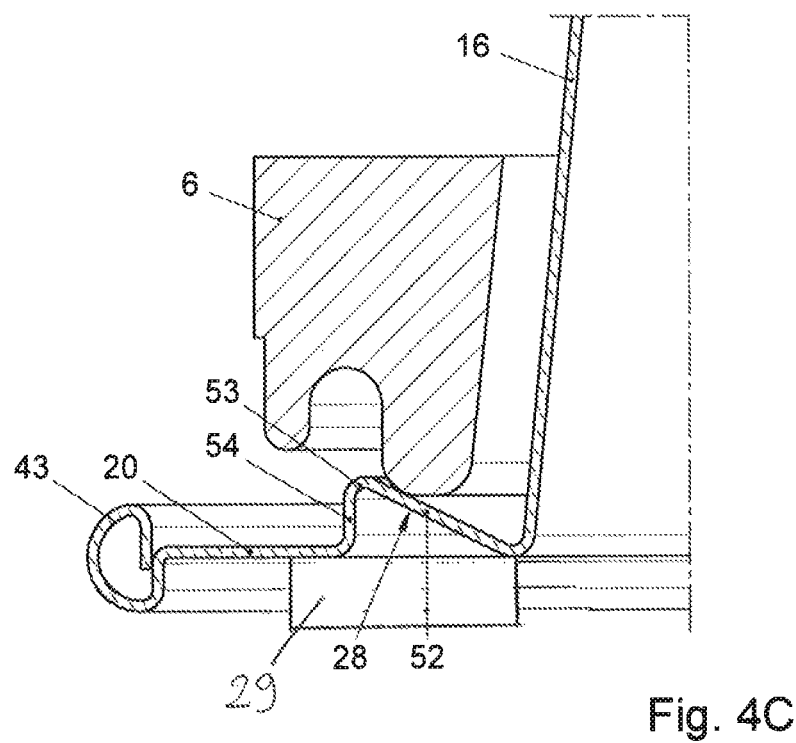
FIG. 4C shows a third embodiment of a sealing member at the outwardly extending flange of a capsule according to the invention.

FIG. 4C shows a third embodiment of a sealing member 28 at the outwardly extending flange 20 of a capsule according to the invention, which together with the side wall 16 of the aluminum capsule body forms an additional bearing for the enclosing member. The shown sealing member 28 comprises a projection 53 projecting from the outwardly extending flange 20 and an inclined, substantially flat plateau 52 between a rounded topmost end portion of the projection 53 and the side wall 16 of the aluminum capsule body. In this embodiment the bearing is formed by the projection 53, the plateau 52 and the side wall 16 of the aluminum capsule body. The distance between the top of the projection 53 and the side wall 16 is such that the free contact end of the annular element 6 is enclosed by the projection 53 and the side wall 16 of the aluminum capsule body if the capsule is positioned in the enclosing member of the beverage preparation device and the enclosing member is closed by means of a closing member of the beverage preparation device. In particular the distance between the projection 53 and the side wall 16 of the aluminum capsule body is such that the free contact end of the annular element 6 is contacted by the projection 53 and the side wall 16 and in the shown embodiment also the plateau 52 of the aluminum capsule body if the capsule is positioned in the enclosing member of the beverage preparation device and the enclosing member is closed by means of a closing member of the beverage preparation device.

Figure 4D:
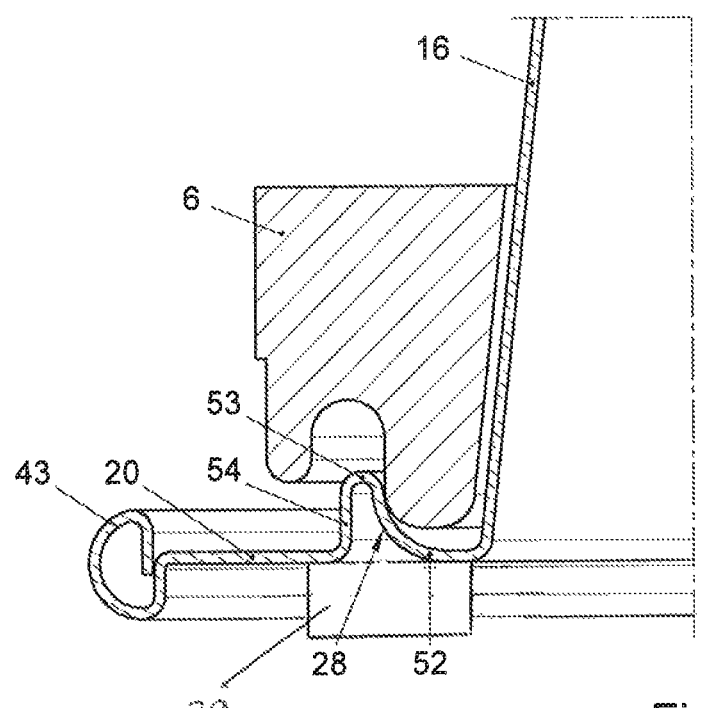
FIG. 4D shows a fourth embodiment of a sealing member at the outwardly extending flange of a capsule according to the invention.
Figure 4E:
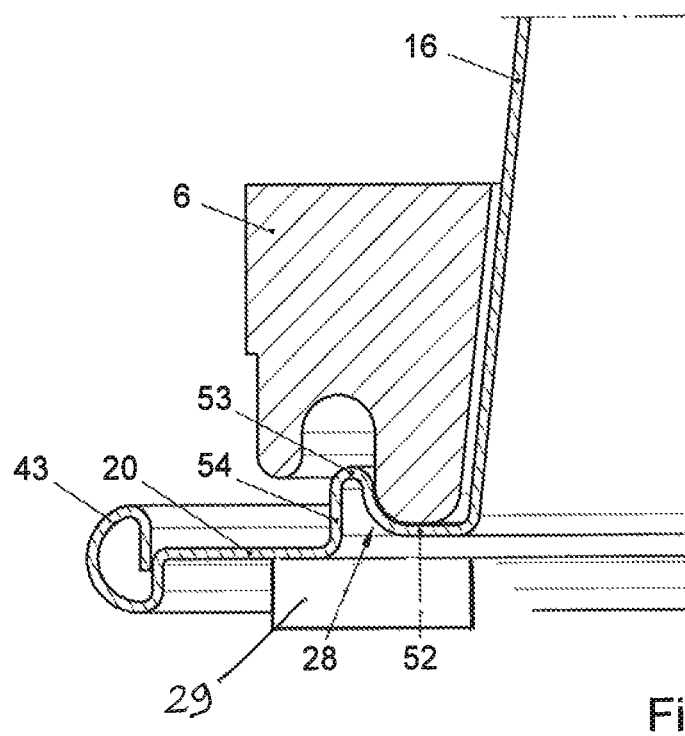
FIG. 4E shows a fifth embodiment of a sealing member at the outwardly extending flange of a capsule according to the invention.

FIG. 4D shows a fourth embodiment of a sealing member 28 at the outwardly extending flange 20 of a capsule according to the invention, which together with the side wall 16 of the aluminum capsule body forms an additional bearing for the enclosing member. When compared with FIG. 4C the following differences are noted. In this fourth embodiment the plateau 52 is curved, and comprises a curved portion and also a flat portion which is situated at the same level as the portion of the outwardly extending flange 20 between the projection 53 and the curved edge 43. The curved portion preferably conforms to the shape of the free contact end of the annular element 6. FIG. 4E shows a fifth embodiment of a sealing member 28 at the outwardly extending flange 20 of a capsule according to the invention, which together with the side wall 16 of the aluminum capsule body forms a bearing for the enclosing member. When compared with FIG. 4D the following difference is noted. In this fifth embodiment the flat portion of the plateau 52 is situated at a distance above the portion of the outwardly extending flange 20 between the projection 53 and the curved edge 43. The distance between 2 the projection 53 is preferably 0.9-1.25 mm, which allows the free end of the closing member of widely used and commercially available beverage preparation devices (such as the Citiz, Lattisima, U, Maestria, Pixie, Inissia and Essenza) to be reliably squeezed against the projections 53 with the side wall 16 in close proximity thereto.

In the embodiments shown in FIGS. 4C to 4E the projection 53 comprises an outer projection side wall 54 which is transverse to the portion of the outwardly extending flange between the projection 53 and the curled edge 43, but in other embodiments this outer projection side wall 54 can be inclined with regard to the portion of the outwardly extending flange 20.

In all the embodiments shown in FIGS. 4A to 4E each of the projections comprises a projection top constituting a portion of the projection, for instance a half, a third or a quarter of the projection, that is axially most distal from the base portion of the flange 28 to which the cover 14 is attached. At least one projection but preferably all projections forming the additional bearing is/are configured such that its projection top exerts a radial force on the free contact end of the annular element 6 if the capsule is positioned in the enclosing member of the beverage preparation device and the enclosing member is closed by means of a closing member of the beverage preparation device.

Figure 4F:
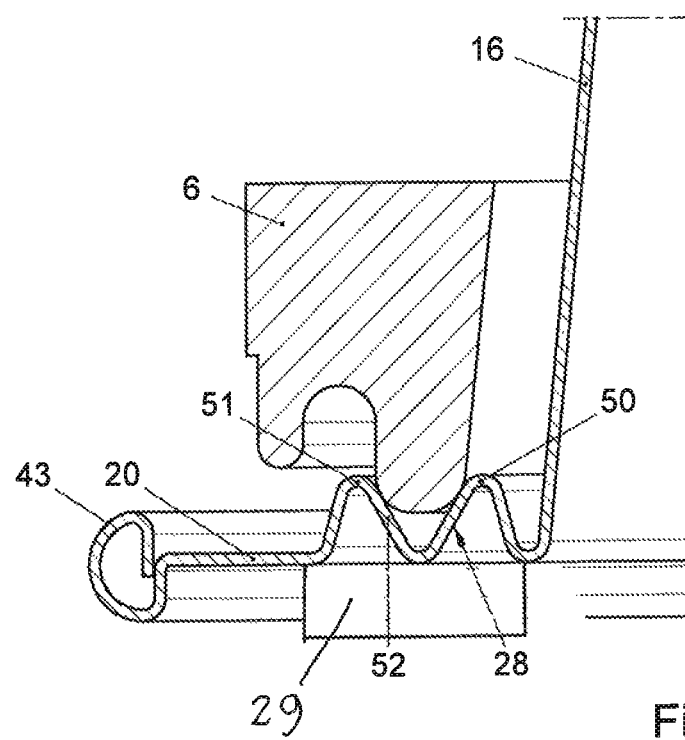
FIG. 4F shows a sixth embodiment of a seal member at the outwardly extending flange of a capsule according to the invention.

FIG. 4F shows a sixth embodiment of a seal member 28 at the outwardly extending flange 20 of a capsule according to the invention. When compared with e.g. FIG. 4B the following differences are noted. In this sixth embodiment the plateau 52 is V-shaped, with the bottom of the V-shaped being at the same level as the base portion of the outwardly extending flange 20 between the outer projection 51 and the curled edge 43. In this manner no bearing for the free contact end of the annular member 6 is formed, but the projection top of the inner projection 50 exerts a radial force direct outwardly on the free contact end of the annular element 6 and the projection top of the outer projection 51 exerts a radial force direct inwardly on the free contact end of the annular element 6 if the capsule is positioned in the enclosing member of the beverage preparation device and the enclosing member is closed by means of a closing member of the beverage preparation device. In this manner the free contact end is squeezed by the sealing member 28 thereby providing a satisfactory seal.

In capsules in which the sealing member 28 has projections 50, 51 and a plateau or through 52 in between, as by way of example shown in FIGS. 4A, 4B, and 4F, the center of the plateau or through 52, which extends circumferentially around the center axis of the capsule, preferably has a diameter of 29-33 mm, more preferably 30.0-31.4 mm and most preferably 30.3-31.0 mm, so that (seen in radial cross-section) the free end of the closing member of widely used and commercially available beverage preparation devices (such as the Citiz, Lattisima, U, Maestria, Pixie, Inissia and Essenza) lands accurately centered between the projections 50, 51 and the squeezing effect is evenly distributed over the inner and outer projections 50, 51. For effective squeezing in such apparatuses, the distance between projections 50, 51 is preferably 0.9-1.25 mm.

Figure 4G:
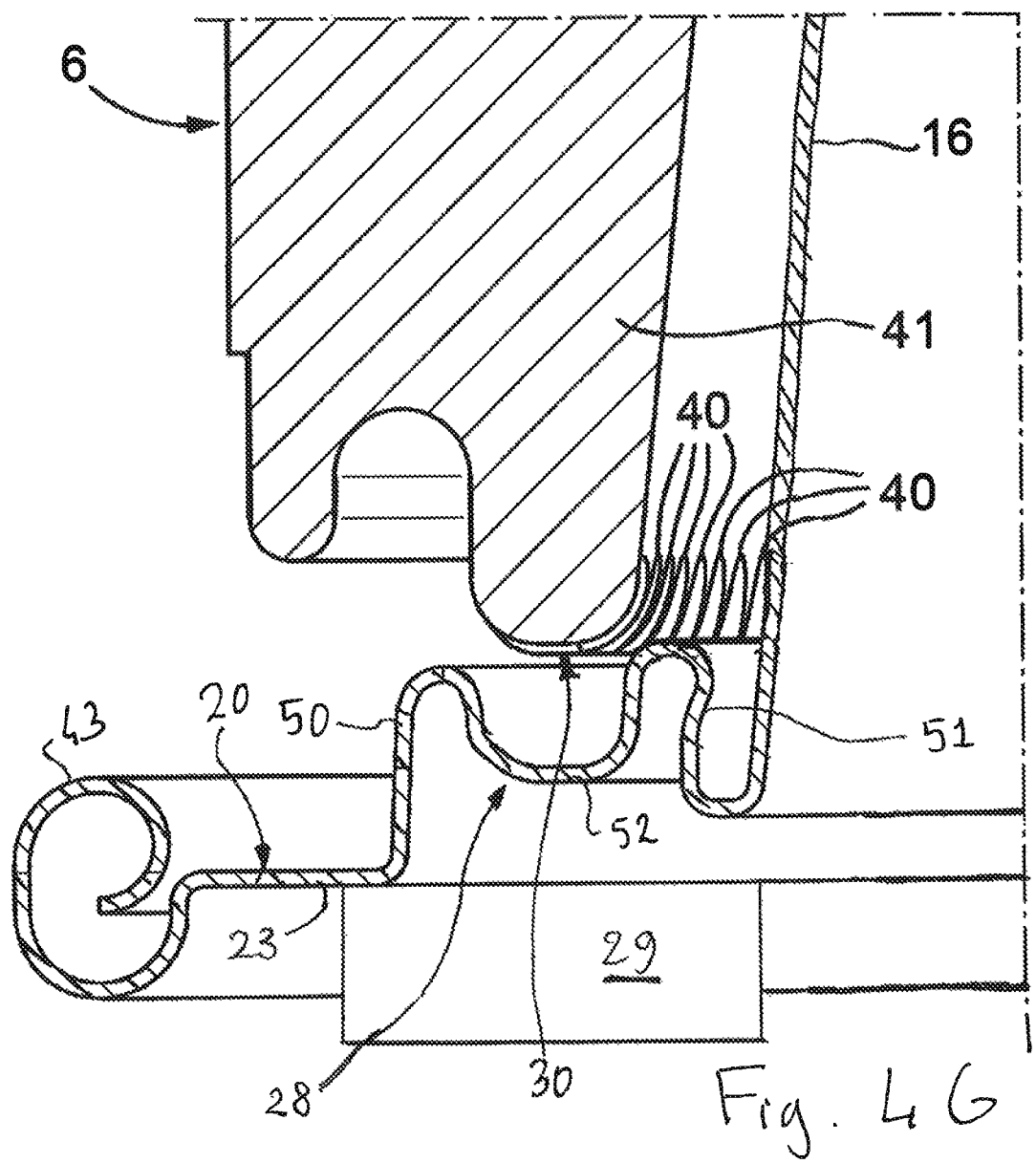
FIG. 4G shows a seventh embodiment of a seal member at the outwardly extending flange of a capsule according to the invention.

FIG. 4G shows a seventh embodiment of a seal member 28 at the outwardly extending flange 20 of a capsule according to the invention. As also shown in FIG. 2, the enclosing member 6 of the beverage preparation device has an annular element 41 having a free contact end 30 with a plurality of radially extending open grooves 40 of which some are shown in FIG. 4G.

As in the examples shown in FIGS. 4A, 4B and 4F, the sealing member 28 has two spaced projections 50 and 51, each projecting axially from a base portion 21, 23 of the outwardly extending flange 20, to which base portions 21, 23 the cover 14 is attached, in a direction away from the cover 14. As in the example shown in FIG. 4F, a plateau 52 having a rounded bottom is located between the two projections 50 and 51.

A difference compared with the examples shown in FIGS. 4A, 4B and 4F is that, in the example shown in FIG. 4G, a first one of the two projections 51 projects further from a base portion 23 of the outwardly extending flange 20 than a second one of the two projections 50.

The free contact end 30 of the annular element 41 may first contact the first one of the two projections 51 and subsequently contacts the second one of the two projections if the capsule is positioned in the enclosing member 6 of the beverage preparation device and as the enclosing member 6 is closed by means of the closing member of the beverage preparation device.

If the enclosing member is closed by means of the closing member, the free contact end 30 of the annular element 41 has an inner circumferential surface portion 71 contacting the inner projection 51 and an outer circumferential surface portion 70 contacting the outer projection 50. The radially extending open grooves 40 are deeper in the inner surface portion 71 than in the outer surface portion 70 or the grooves may be absent in the outer surface portion 70. Thus, the smaller, relatively stiff outer projection 50 is firmly and accurately pressed against the relatively smooth outer surface portion 70 of the free contact end 30.

When the free contact end 30 of the annular element 41 contacts the inner one of the two projections 51, the capsule is centered relative to the enclosing member 6. Moreover, if the inner one of the two projections 51 is radially too far to the outside, for instance locally due to non-circularity or generally due to the free contact area having a relatively small diameter, the free contact end urges the inner one of the two projections 71 radially inwardly. The outer one of the two projections is thereby entrained inwardly, so that a reliable firm sealing pressure is exerted onto the outer one of the two projections 50 in spite of the relatively small deformability of that outer projection 51. Due to the stiffness of the outer one of the two projections 50, a large contact force is exerted as it is deformed, the relatively high counter pressure provides a particularly reliable seal with high pressure resistance.

The distance between the two projections 50 and 51 is such that ultimately the free contact end 30 of the annular element 41 is squeezed between converging surfaces of the two projections 50 and 51 when the enclosing member is fully closed by means of the closing member.

The plateau 52 is axially spaced from the cover 14. This allows the plateau 52 between the projections 50, 51 to be displaced in the direction of movement of the free end 30 of the annular element 41 as the enclosing member 6 is closed, urging the projections 50, 51 to be tilted and roll off inwardly against the free end 30 of the annular element 41 as the enclosing member 6 is closed. This increases the radial sealing pressure that is exerted (in addition to the axial closing pressure), so that an increased sealing pressure is available for providing a satisfactory seal.

Figure 5A:
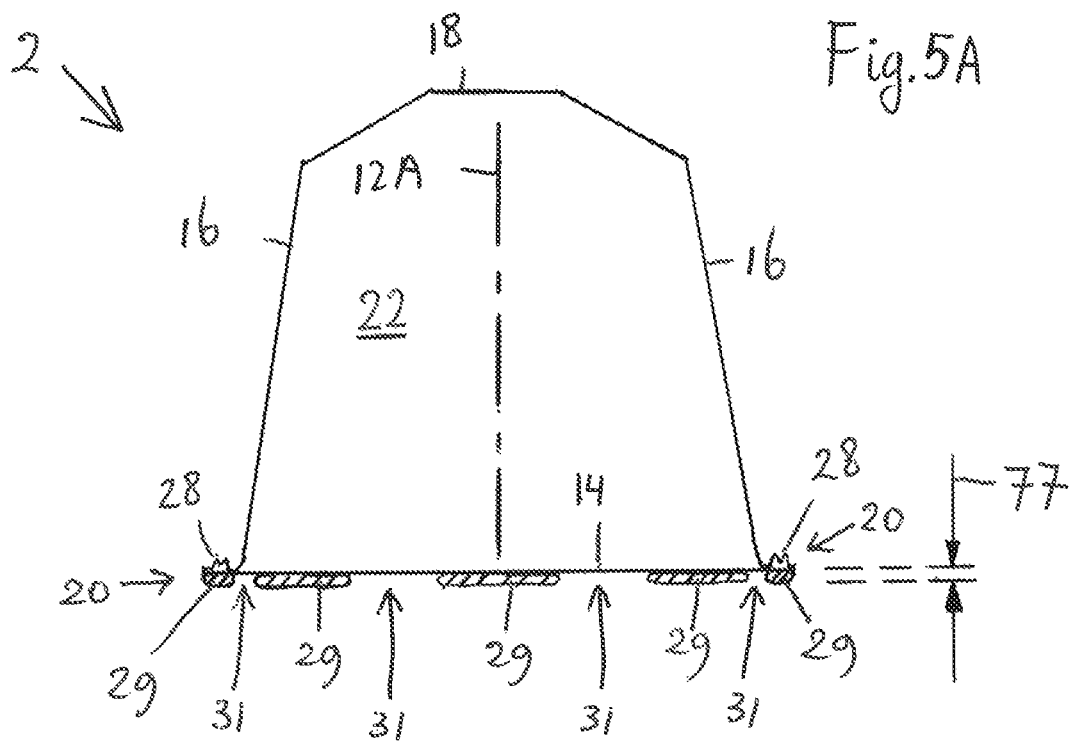
FIG. 5A shows in side view a further example of a capsule according to the invention, based on a first embodiment of the elastic support structure of the capsule.
Figure 5B:
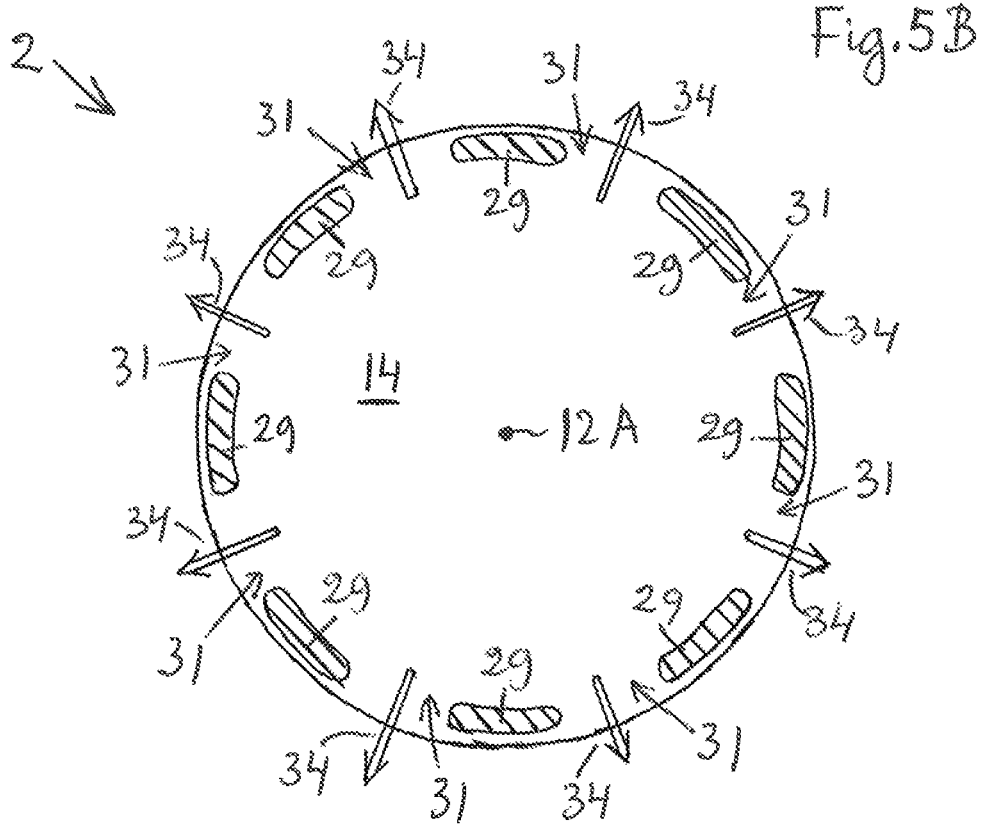
FIG. 5B shows the example of FIG. 5A in an orthogonal view onto the outer cover surface of the cover of the capsule.

Reference is now made to FIGS. 5A-5B, which show the abovementioned first embodiment of the elastic support structure of the shown capsule 2 according to the invention. In the shown example, the elastic support structure has been indicated by the reference numerals 29. It is noted that the capsule 2 has been shown in FIGS. 5A-5B without a curled outer edge, such as the abovementioned curled outer edges 43. This has been done merely for reasons of clarity, the capsule 2 of FIGS. 5A-5B may of course be provided with various kinds of such curled outer edges.

FIGS. 5A-5B illustrate that the elastic support structure 29 is attached to the outer cover surface of the cover 14 in a support structure attachment area of the outer cover surface, wherein the support structure attachment area, as seen in projection along the central capsule body axis 12A, is extending at least partly along the outwardly extending flange 20 and at least partly in the circumferential capsule direction.

FIGS. 5A-5B further illustrate that, if the capsule 2 would be freely resting with its elastic support structure 29 on a fully straight reference surface, the elastic support structure would then provide a spacing 77 between the outwardly extending flange 20 and said fully straight reference surface, said spacing 77 being constant all around in the circumferential capsule direction.

Furthermore FIGS. 5A-5B illustrate that, if the capsule 2 would be positioned in the enclosing member 6 of the beverage preparation device and if the enclosing member 6 would be closed by means of the closing member 8 of the beverage preparation device, the elastic support structure 29 along parts of the circumferential capsule direction would then define beverage leakage passageways 31 passing at least radially through the elastic support structure 29 and extending between the outer cover surface of the cover 14 of the capsule 2 and the closing member 8 of the beverage preparation device. Therein, the arrows 34, shown in FIG. 5B, are indicating beverage leakage flow, which in use is occurring through the beverage leakage passageways 31.

From FIGS. 5A-5B it furthermore follows that the capsule 2, which comprises this first embodiment of the elastic support structure 29, has the more specific features that the support structure attachment area has a shape which has at least one interruption relative to a closed-loop shape all around in the circumferential capsule direction, and that, as seen in projection along the central capsule body axis 12A onto the outer cover surface of the cover 14, at least one first beverage leakage passageway 31 of the beverage leakage passageways 31 corresponds to said at least one interruption, respectively, relative to said closed-loop shape.

Reference is now made to FIGS. 6A-6B, which show the abovementioned second embodiment of the elastic support structure of the shown capsule 102 according to the invention. In the shown example, the elastic support structure has been indicated by the reference numerals 129A and 129B. It is noted that the capsule 102 has been shown in FIGS. 6A-6B without a curled outer edge, such as the abovementioned curled outer edges 43. This has been done merely for reasons of clarity, the capsule 102 of FIGS. 6A-6B may of course be provided with various kinds of such curled outer edges.

FIGS. 6A-6B illustrate that the elastic support structure 129A-129B is attached to the outer cover surface of the cover 14 in a support structure attachment area of the outer cover surface, wherein the support structure attachment area, as seen in projection along the central capsule body axis 12A, is extending at least partly along the outwardly extending flange 20 and at least partly in the circumferential capsule direction (in this case in fact all around in the circumferential capsule direction).

FIGS. 6A-6B further illustrate that, if the capsule 102 would be freely resting with its elastic support structure 129A-129B on a fully straight reference surface, the elastic support structure would then provide a spacing 177 between the outwardly extending flange 20 and said fully straight reference surface, said spacing 177 being constant all around in the circumferential capsule direction.

Furthermore FIGS. 6A-6B illustrate that, if the capsule 102 would be positioned in the enclosing member 6 of the beverage preparation device and the enclosing member 6 would be closed by means of the closing member 8 of the beverage preparation device, the elastic support structure 129A-129B along parts of the circumferential capsule direction would define beverage leakage passageways 131 passing at least radially through the elastic support structure 129A-129B and extending between the outer cover surface of the cover 14 of the capsule 102 and the closing member 8 of the beverage preparation device. Therein, the arrows 134, shown in FIG. 6B, are indicating beverage leakage flow, which in use is occurring through the beverage leakage passageways 131.

From FIGS. 6A-6B it furthermore follows that the capsule 102, which comprises this second embodiment of the elastic support structure 129A-129B, has the more specific features that at least one second beverage leakage passageway 131 of the beverage leakage passageways 131 is defined by the elastic support structure 129A-129B in that, if the capsule 102 is freely resting with its elastic support structure on said fully straight reference surface, the elastic support structure has a locally reduced height, measured along the central capsule body axis 12A, said locally reduced height being smaller than said spacing 177 between the outwardly extending flange 20 and said fully straight reference surface.

In the foregoing specification, the invention has been described with reference to specific examples of embodiments of the invention. It will, however, be evident that various modifications and changes may be made therein without departing from the broader spirit and scope of the invention as set forth in the appended claims.

The invention claimed is:

1. Capsule containing a substance for the preparation of a potable beverage by extracting and/or dissolving the substance by supplying a fluid under pressure into the capsule, wherein the capsule comprises an aluminum capsule body having a central capsule body axis, and wherein a circumferential capsule direction of the capsule is extending around said central capsule body axis, said aluminum capsule body being provided with a bottom, a side wall and an outwardly extending flange, the capsule further comprising an aluminum cover attached to the outwardly extending flange, the cover hermetically closing the capsule, wherein the side wall, the bottom and the cover are enclosing an inner space of the capsule, and wherein the cover has an outer cover surface facing away from the inner space and an inner cover surface opposite the outer cover surface and facing toward the inner space, and wherein the capsule further comprises a sealing member at the outwardly extending flange for providing a fluid sealing contact with an enclosing member of a beverage preparation device when the capsule is positioned in the enclosing member of the beverage preparation device and the enclosing member is closed by a closing member of the beverage preparation device such that the outwardly extending flange of the capsule and at least a portion of the sealing member of the capsule are sealingly engaged with the enclosing member of the beverage preparation device, wherein the enclosing member of the beverage preparation device comprises an annular element having a central annular element axis and a free contact end,
wherein the capsule further comprises an elastic support structure, which is attached to the outer cover surface of the cover in a support structure attachment area of the outer cover surface, wherein the support structure attachment area, as seen in projection along the central capsule body axis, is extending at least partly along the outwardly extending flange and at least partly in the circumferential capsule direction, in such manner that, when the capsule is freely resting with its elastic support structure on a fully straight reference surface, the elastic support structure provides a spacing between the outwardly extending flange and said fully straight reference surface, said spacing being constant all around in the circumferential capsule direction, the elastic support structure being formed by a separate piece attached to the outer cover surface of the cover and being made of rubber-elastic material.

2. Capsule according to claim 1, wherein, when the capsule is positioned in the enclosing member of the beverage preparation device and the enclosing member is closed by the closing member of the beverage preparation device, the elastic support structure along parts of the circumferential capsule direction defines beverage leakage passageways passing at least radially through the elastic support structure and extending between the outer cover surface of the cover of the capsule and the closing member of the beverage preparation device.

3. Capsule according to claim 2, wherein the support structure attachment area has a shape which has at least one interruption relative to a closed-loop shape all around in the circumferential capsule direction, and wherein, as seen in projection along the central capsule body axis onto the outer cover surface of the cover, at least one first beverage leakage passageway of the beverage leakage passageways corresponds to said at least one interruption, respectively, relative to said closed-loop shape.

4. Capsule according to claim 2, wherein at least one second beverage leakage passageway of the beverage leakage passageways is defined by the elastic support structure in that, when the capsule is freely resting with its elastic support structure on said fully straight reference surface, the elastic support structure has a locally reduced height, measured along the central capsule body axis, said locally reduced height being smaller than said spacing between the outwardly extending flange and said fully straight reference surface.

5. Capsule according to claim 1, wherein said spacing between the outwardly extending flange and said fully straight reference surface is at least 0.1 mm or at least 0.2 mm or at least 0.8 mm.

6. Capsule according to claim 1, wherein said spacing between the outwardly extending flange and said fully straight reference surface is at most 3 mm or at most 2 mm or at most 1.2 mm.

7. Capsule according to claim 1, wherein the sealing member is integral with the outwardly extending flange and comprises at least one projection projecting from the outwardly extending flange, said at least one projection comprising a projection top, and wherein the at least one projection is configured such that its projection top exerts a radial force on the free contact end of the annular element when the capsule is positioned in the enclosing member of the beverage preparation device and the enclosing member is closed by-the closing member of the beverage preparation device.

8. Capsule according to claim 7, wherein the sealing member comprises a further projection projecting from the outwardly extending flange and a plateau between said two projections, wherein the distance between the two projections is such that the free contact end of the annular element is enclosed between the two projections when the capsule is positioned in the enclosing member and as the enclosing member is closed by the closing member.

9. Capsule according to claim 8, wherein a first one of the two projections projects further from a base portion of the outwardly extending flange, to which base portion the cover is attached, than a second one of the two projections.

10. Capsule according to claim 1, wherein the sealing member and the remainder of the capsule body are made of the same plate material.

11. System for preparing a potable beverage from a capsule using a fluid supplied under pressure into the capsule, the system comprising:
a beverage preparation device comprising an enclosing member for receiving the capsule, wherein the beverage preparation device further comprises a closing member for closing the enclosing member of the beverage preparation device, wherein the enclosing member of the beverage preparation device further comprises an annular element having a central annular element axis and a free contact end;
a capsule containing a substance for the preparation of a potable beverage by extracting and/or dissolving the substance by means of the fluid supplied under pressure into the capsule, wherein the capsule comprises an aluminum capsule body having a central capsule body axis, and wherein a circumferential capsule direction of the capsule is extending around said central capsule body axis, said aluminum capsule body being provided with a bottom, a side wall and an outwardly extending flange, the capsule further comprising an aluminum cover attached to the outwardly extending flange, the cover hermetically closing the capsule, wherein the side wall, the bottom and the cover are enclosing an inner space of the capsule, and wherein the cover has an outer cover surface facing away from the inner space and an inner cover surface opposite the outer cover surface and facing toward the inner space, and wherein the capsule further comprises a sealing member at the outwardly extending flange for providing a fluid sealing contact with the enclosing member of the beverage preparation device when the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged with the enclosing member of the beverage preparation device,
wherein the capsule further comprises an elastic support structure, which is attached to the outer cover surface of the cover in a support structure attachment area of the outer cover surface, wherein the support structure attachment area, as seen in projection along the central capsule body axis, is extending at least partly along the outwardly extending flange and at least partly in the circumferential capsule direction, in such manner that, when the capsule is freely resting with its elastic support structure on a fully straight reference surface, the elastic support structure provides a spacing between the outwardly extending flange and said fully straight reference surface, said spacing being constant all around in the circumferential capsule direction, the elastic support structure being formed by a separate piece attached to the outer cover surface of the cover and being made of rubber-elastic material.

12. System according to claim 11, wherein, when the capsule is positioned in the enclosing member of the beverage preparation device and the enclosing member is closed by means of the closing member of the beverage preparation device, the elastic support structure along parts of the circumferential capsule direction defines beverage leakage passageways passing at least radially through the elastic support structure and extending between the outer cover surface of the cover of the capsule and the closing member of the beverage preparation device.

13. System according to claim 12, wherein the support structure attachment area has a shape which has at least one interruption relative to a closed-loop shape all around in the circumferential capsule direction, and wherein, as seen in projection along the central capsule body axis onto the outer cover surface of the cover, at least one first beverage leakage passageway of the beverage leakage passageways corresponds to said at least one interruption, respectively, relative to said closed-loop shape.

14. System according to claim 12, wherein at least one second beverage leakage passageway of the beverage leakage passageways is defined by the elastic support structure in that, when the capsule is freely resting with its elastic support structure on said fully straight reference surface, the elastic support structure has a locally reduced height, measured along the central capsule body axis, said locally reduced height being smaller than said spacing between the outwardly extending flange and said fully straight reference surface.

15. System according to claim 11, wherein said spacing between the outwardly extending flange and said fully straight reference surface is at least 0.1 mm or at least 0.2 mm or at least 0.8 mm.

16. System according to claim 11, wherein said spacing between the outwardly extending flange and said fully straight reference surface is at most 3 mm or at most 2 mm or at most 1.2 mm.

17. System according to claim 11, wherein the sealing member is integral with the outwardly extending flange and comprises at least one projection projecting from the outwardly extending flange, said at least one projection comprising a projection top, and wherein the at least one projection is configured such that its projection top exerts a radial force on the free contact end of the annular element when the capsule is positioned in the enclosing member of the beverage preparation device and the enclosing member is closed by means of the closing member of the beverage preparation device.

18. System according to claim 17, wherein the sealing member comprises a further projection projecting from the outwardly extending flange and a plateau between said two projections, wherein the distance between the two projections is such that the free contact end of the annular element is squeezed between converging surfaces of the two projections when the capsule is positioned in the enclosing member of the beverage preparation device and the enclosing member is closed by means of the closing member of the beverage preparation device.

19. System according to claim 18, wherein a first one of the two projections projects further from a base portion of the outwardly extending flange, to which base portion the cover is attached, than a second one of the two projections, such that the free contact end of the annular element first contacts the first one of the two projections and subsequently contacts the second one of the two projections when the capsule is positioned in the enclosing member and as the enclosing member is closed by means of the closing member.

20. System according to claim 18, wherein the first one of the two projections is an inner one of the two projections and wherein the first circumferential surface portion is radially outside of the second circumferential surface portion.

21. Capsule according to claim 1, wherein the elastic support structure that is made of the rubber-elastic material is attached directly to the outer cover surface of the cover by an adhesive or welding.

22. System according to claim 11 wherein the elastic support structure that is made of the rubber-elastic material is attached directly to the outer cover surface of the cover by an adhesive or welding.

* * * * *